United States Patent
Ishizu

(10) Patent No.: US 9,756,195 B2
(45) Date of Patent: Sep. 5, 2017

(54) COMMUNICATION APPARATUS CAPABLE OF COMMUNICATING WITH EXTERNAL APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Akihiko Ishizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/841,184

(22) Filed: Aug. 31, 2015

(65) Prior Publication Data
US 2016/0065830 A1 Mar. 3, 2016

(30) Foreign Application Priority Data
Sep. 3, 2014 (JP) .................................. 2014-179324

(51) Int. Cl.
*H04N 1/00* (2006.01)
*H04W 4/00* (2009.01)

(52) U.S. Cl.
CPC ........ *H04N 1/00204* (2013.01); *H04W 4/008* (2013.01); *H04N 2201/0084* (2013.01)

(58) Field of Classification Search
None
See application file for complete search history.

(56) References Cited

U.S. PATENT DOCUMENTS

| 2007/0177822 A1* | 8/2007 | Uno | H04N 1/00204 382/305 |
| 2010/0091136 A1* | 4/2010 | Nakase | H04N 1/00204 348/231.2 |
| 2011/0191280 A1* | 8/2011 | Takahashi | H04N 1/32101 706/50 |

FOREIGN PATENT DOCUMENTS

JP 2013-162303 A 8/2013

* cited by examiner

*Primary Examiner* — James Hannett
(74) *Attorney, Agent, or Firm* — Canon U.S.A. Inc., IP Division

(57) ABSTRACT

A communication apparatus includes a connection unit that connects to a recording medium on which content data and management information about the content data are recorded, a communication unit that communicates with an external apparatus, and a control unit that, in a case where the communication apparatus has received a request for the management information about the content data from the external apparatus, reads out, in response to the request, the management information about the content data from the recording medium and controls the communication unit to transmit the read-out management information to the external apparatus, and reads out header information recorded in a header region of the content data from the header region and store the read-out header information.

13 Claims, 10 Drawing Sheets

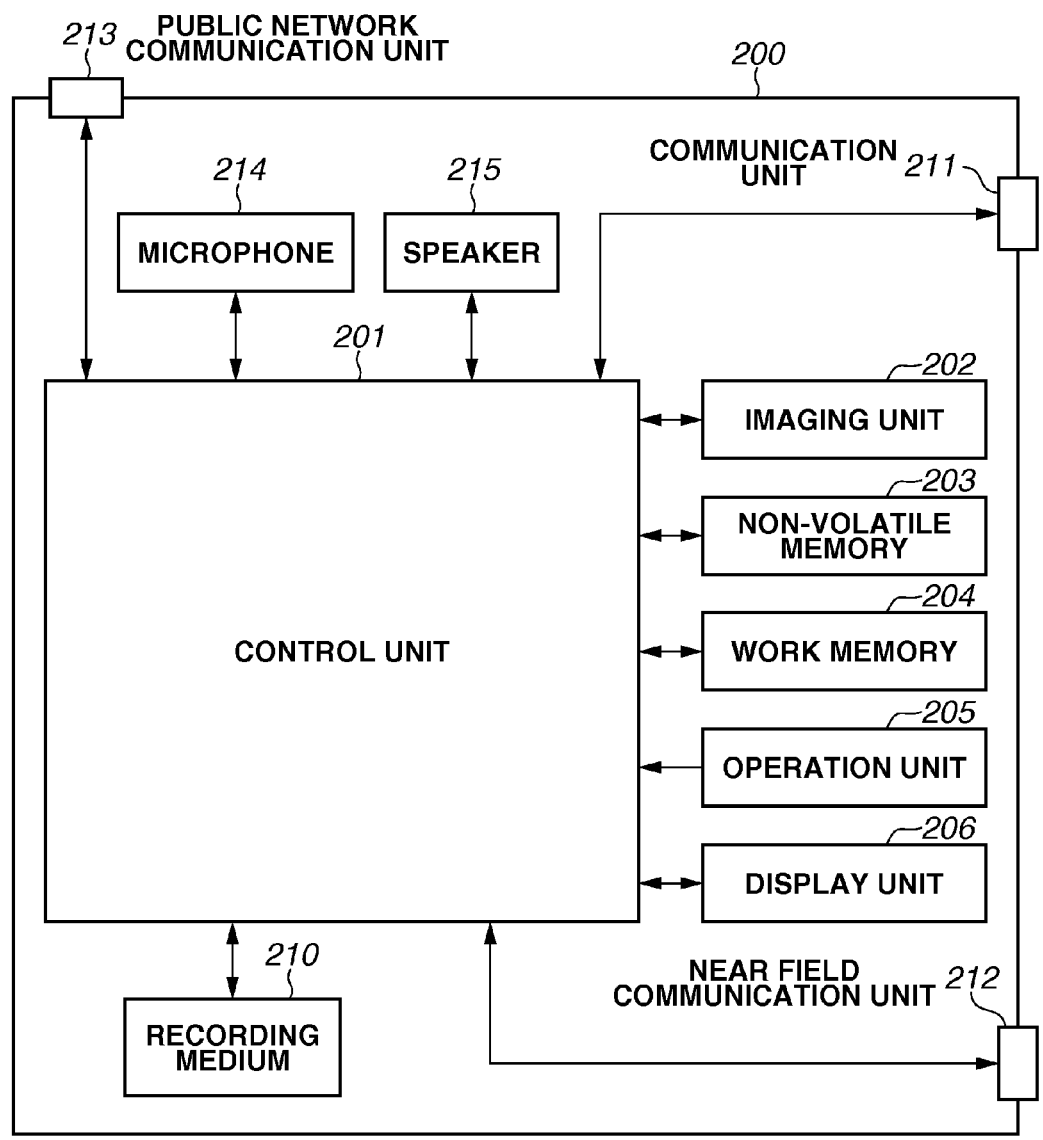

FIG.3A

| | API NAME | REQUEST (ARGUMENT) | RESPONSE | DESCRIPTION |
|---|---|---|---|---|
| 301 | RequestProductInfo | NONE | · PRODUCT NAME<br>· MANUFACTURER NAME<br>· FIRMWARE VERSION<br>· SERIAL NUMBER | ACQUIRE PRODUCT INFORMATION ABOUT DIGITAL CAMERA |
| 302 | RequestMemoryInfo | NONE | · STORAGE REGION ID<br>· AVAILABLE STORAGE CAPACITY<br>· FREE SPACE<br>· NUMBER OF STORED CONTENT FILES | ACQUIRE INFORMATION ABOUT STORAGE REGION OF DIGITAL CAMERA |
| 303 | RequestContentInfo | · STORAGE REGION ID<br>· TYPE OF CONTENT FORMAT<br>· NUMBER OF ACQUISITION REQUESTS | · CONTENT ID<br>· CONTENT FILE NAME<br>· CONTENT FILE SIZE<br>· CONTENT FILE GENERATION DATE AND TIME | ACQUIRE CONTENT ID AND MANAGEMENT INFORMATION ABOUT CONTENT FILE STORED IN STORAGE REGION OF DIGITAL CAMERA |
| 304 | RequestContent | · CONTENT ID<br>· CONTENT SIZE | · CONTENT FILE | ACQUIRE CONTENT FILE |
| 305 | RequestContentDetailInfo | · CONTENT ID | · CONTENT DETAIL INFORMATION | ACQUIRE DETAIL INFORMATION ABOUT CONTENT FILE |
| | ⋮ | | | |

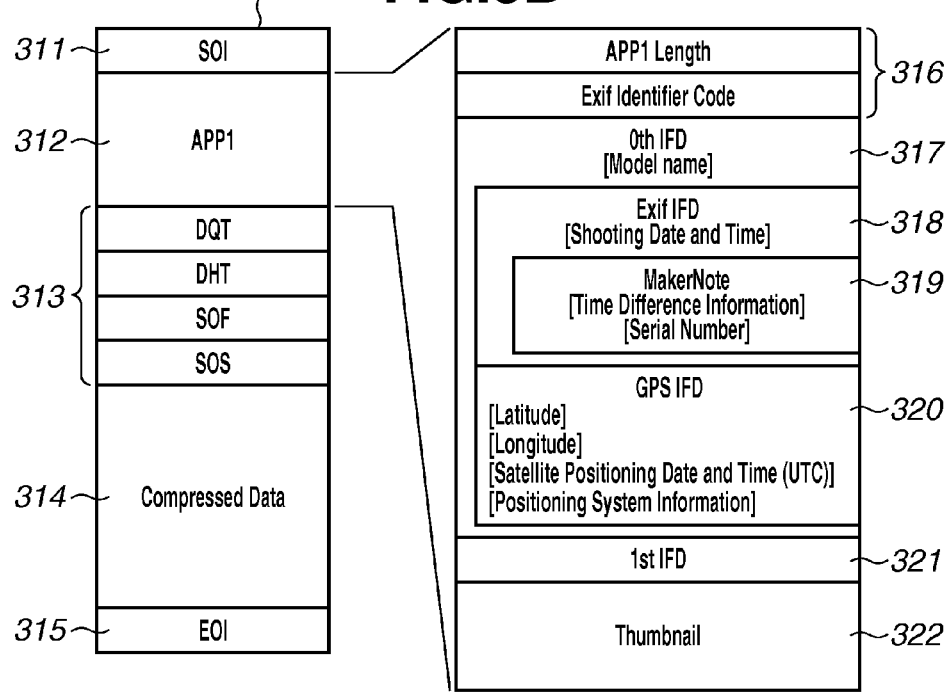

FIG.3B

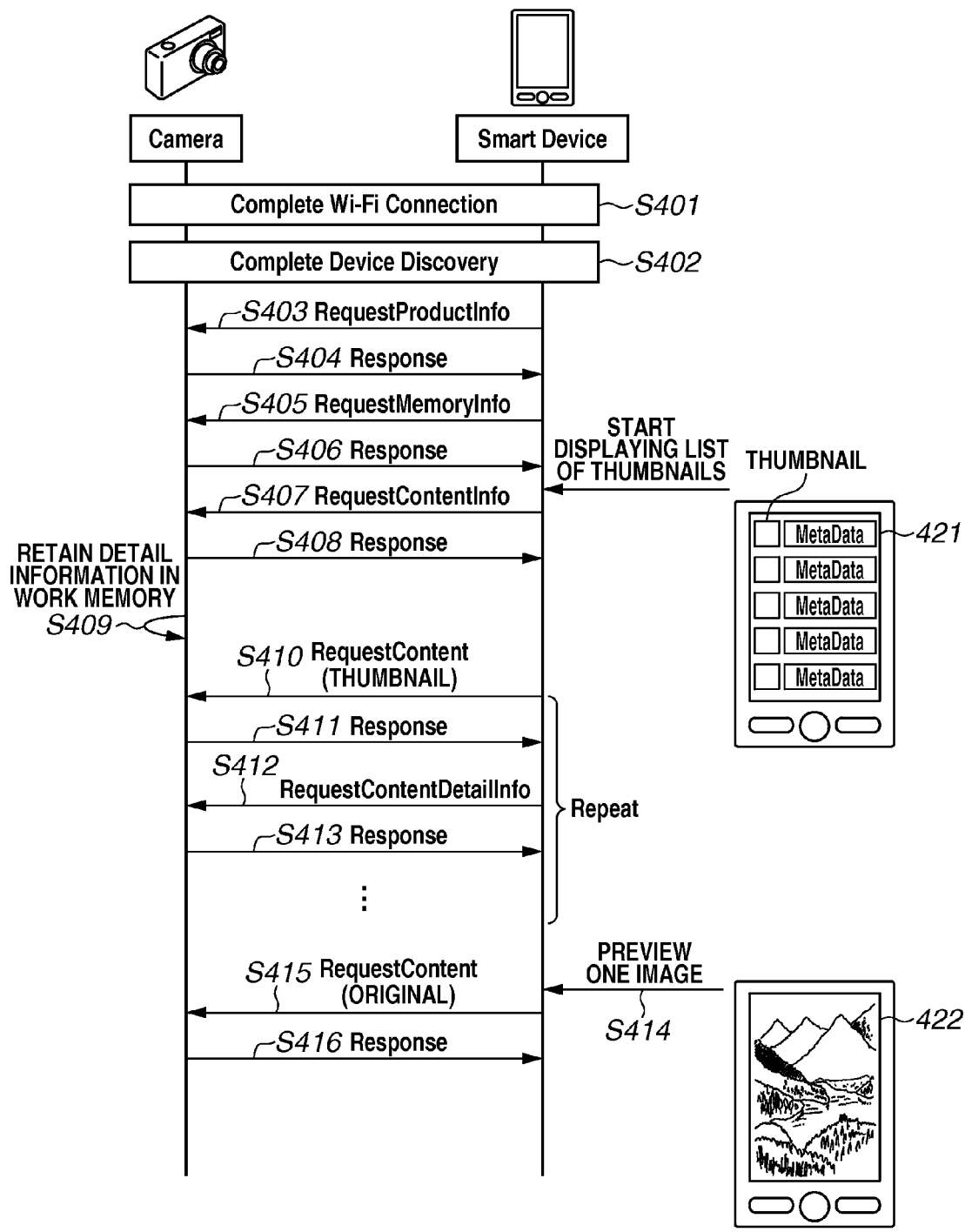

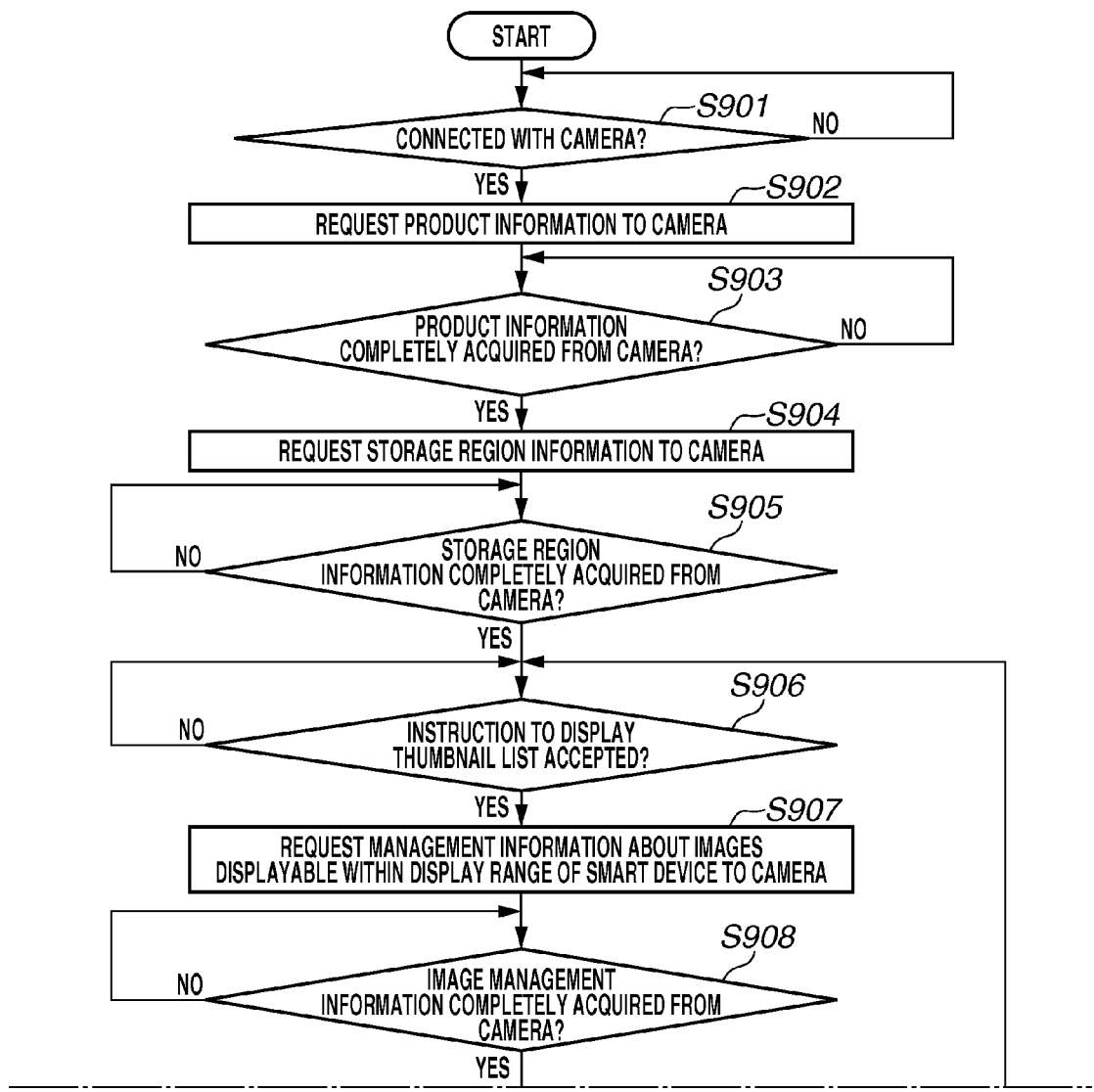

COMMUNICATION APPARATUS CAPABLE OF COMMUNICATING WITH EXTERNAL APPARATUS, CONTROL METHOD FOR COMMUNICATION APPARATUS, AND STORAGE MEDIUM

BACKGROUND

Field

Aspects of the present invention generally relate to a communication apparatus that communicates with an external apparatus.

Description of the Related Art

In recent years, usages of connecting a digital camera to a mobile phone by wireless and using functions of the digital camera via the mobile phone have been becoming popular. For example, Japanese Patent Application Laid-Open No. 2013-162303 discusses a system in which the user connects a digital camera to a mobile phone by a wireless local area network (LAN) and then operates the mobile phone so as to remotely view an image recorded in the digital camera.

For example, using the system discussed in Japanese Patent Application Laid-Open No. 2013-162303, the user can not only view an image or a thumbnail of the image but also import and store image data from the digital camera into the mobile phone. In such a case, for example, metadata (the shooting date and time, data size, etc.) of image data may be used as a criterion for determining whether to store an image. In other words, there may be supposed a usage scene in which the user checks metadata of an image while viewing the image or a thumbnail of the image and determines whether to store the image. However, to enable the user to check the metadata via the mobile phone, a certain amount of time is required since the digital camera needs to read out and analyze a header of image data. For example, in a case where the number of times for which an image data header is to be analyzed becomes large, such as a case where metadata is also displayed together with image data displayed in list form, a sufficient display speed may not be obtained due to the required time of analyzing the header, so that smooth display of information may be hindered.

SUMMARY

According to an aspect of the present invention, a communication apparatus includes a connection unit configured to connect to a recording medium on which content data and management information about the content data are recorded, a communication unit configured to communicate with an external apparatus, and a control unit configured to, in response to receipt of a request for the management information about the content data from the external apparatus, read out the management information about the content data from the recording medium and control the communication unit to transmit the read-out management information to the external apparatus, and to read out header information recorded in a header region of the content data from the header region and store the read-out header information.

Further features of the present disclosure will become apparent from the following description of exemplary embodiments with reference to the attached drawings.

BRIEF DESCRIPTION OF THE DRAWINGS

FIG. 2 is a block diagram illustrating a configuration of a smart device according to the first exemplary embodiment.

FIG. 3A illustrates application programming interfaces (APIs) that the digital camera in the first exemplary embodiment publishes to external apparatuses.

FIG. 3B is a conceptual diagram illustrating a structure of image data in the first exemplary embodiment.

FIG. 4 is a sequence diagram of a system according to the first exemplary embodiment.

DESCRIPTION OF THE EMBODIMENTS

Various exemplary embodiments, features, and aspects of the invention will be described in detail below with reference to the drawings.

Additionally, the exemplary embodiments described below are merely examples for implementing aspects of the present invention, and can be appropriately modified or altered depending on the configuration of an apparatus to which aspects of the present invention are applied or various conditions. Furthermore, the exemplary embodiments can be appropriately combined.

<Configuration of Digital Camera 100>

Figure 1A:
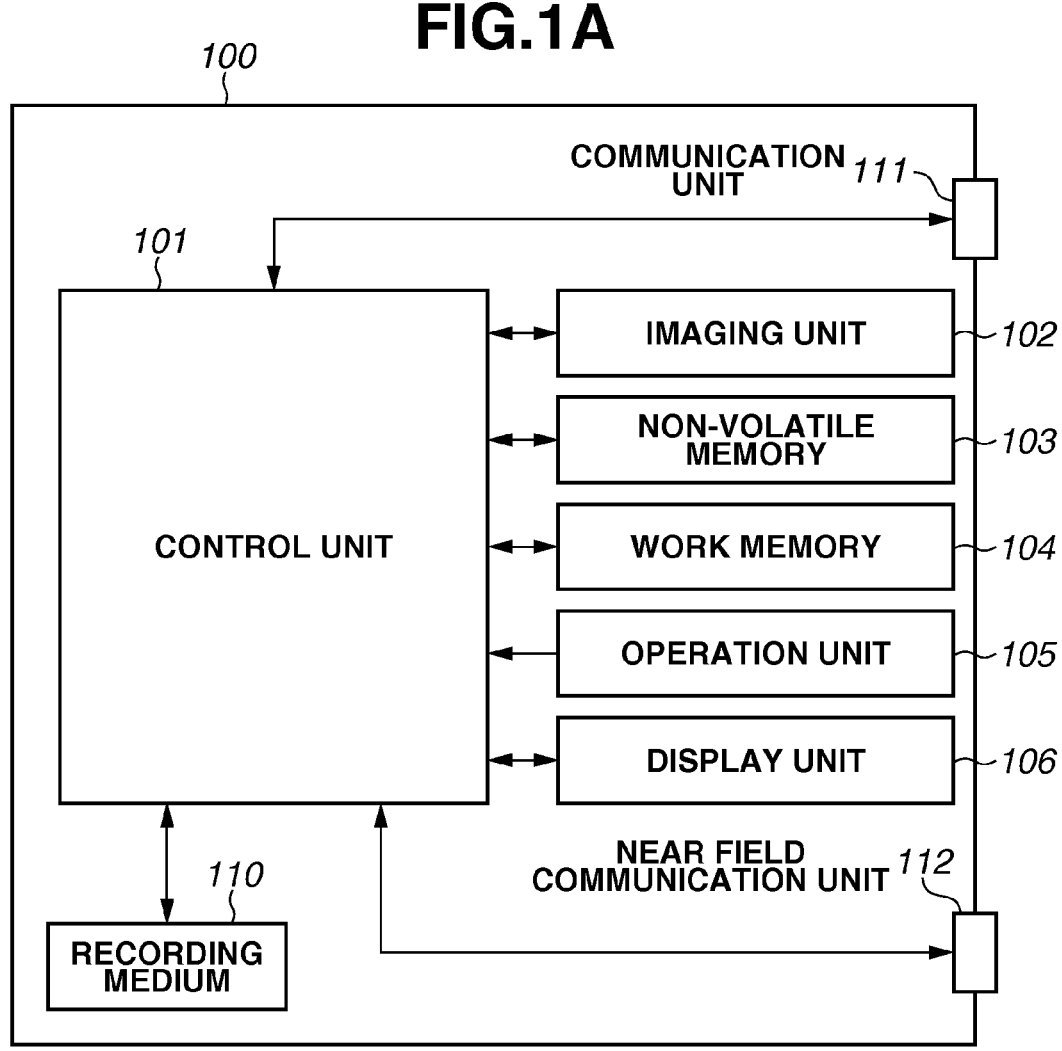
FIG. 1A is a block diagram of a digital camera and FIGS. 1B and 1C are outer appearance views of the digital camera according to a first exemplary embodiment.

FIG. 1A is a block diagram illustrating a configuration example of a digital camera 100, which serves as an example of a communication apparatus according to a first exemplary embodiment. Although, in the present exemplary embodiment, a digital camera is described as an example of the communication apparatus, the communication apparatus is not limited to digital cameras. For example, the communication apparatus can be a portable media player, or an information processing apparatus, such as a tablet device or a personal computer.

A control unit 101 controls each unit of the digital camera 100 according to an input signal or a program, which is described below. Furthermore, instead of the control unit 101 controlling the entire digital camera 100, a plurality of pieces of hardware can share processing to control the entire digital camera 100.

An imaging unit 102 is composed of, for example, an optical lens unit, an optical system that controls the aperture, zoom, and focus of the optical lens unit, and an image sensor that converts light (video image) received via the optical lens unit into an electrical video signal. As the image sensor, a complementary metal-oxide semiconductor (CMOS) sensor or a charge-coupled device (CCD) sensor is used. The imaging unit 102, under the control of the control unit 101, converts object light formed by the optical lens unit included in the imaging unit 102 into an electrical signal via the image sensor, performs noise reduction processing on the electrical signal, and outputs the processed digital data as image data. In the digital camera 100 according to the present exemplary embodiment, image data is recorded on a recording medium 110 according to the Design rule for Camera File system (DCF) standard.

A non-volatile memory 103 is an electrically erasable and recordable memory of the non-volatile type, in which a program, described below, to be executed by the control unit 101 is stored.

A work memory 104 is used as a buffer memory for temporarily retaining image data captured by the imaging unit 102, an image display memory for a display unit 106, and a work area for the control unit 101.

An operation unit 105 is used to receive an instruction issued by the user to the digital camera 100. The operation unit 105 includes, for example, a power button, which is used for the user to issue an instruction for powering on or off the digital camera 100, a release switch, which is used to issue an instruction for shooting, and a playback button, which is used to issue an instruction for playing back image data. The operation unit 105 further includes an operation member, such as a dedicated connection button, which is used to start communicating with an external apparatus via a communication unit 111, which is described below. Furthermore, the operation unit 105 includes a touch panel, which is formed on the display unit 106, described below. The release switch includes a first switch (SW1) and a second switch (SW2). When the release switch becomes half pressed, the SW1 becomes turned on. This enables receiving an instruction for performing a shooting preparation for autofocus (AF) processing, automatic exposure (AE) processing, automatic white balance (AWB) processing, and electro flash pre-emission (EF) processing. Furthermore, when the release switch becomes fully pressed, the SW2 becomes turned on. This enables receiving an instruction for performing a shooting operation.

The display unit 106 performs displaying of a viewfinder image during shooting, displaying of captured image data, and displaying of characters for an interactive operation. The display unit 106 is not necessarily built in the digital camera 100. The digital camera 100 only needs to be capable of connecting to an internal or external display unit 106 and to have at least a display control function for controlling a display operation of the display unit 106.

The recording medium 110 can be used to record image data output from the imaging unit 102 as a file. A system adopted for file management in the digital camera 100 includes, for example, File Allocation Table (FAT). The recording medium 110 may be configured to be detachably attachable to the digital camera 100 or may be built into the digital camera 100. In other words, the digital camera 100 only needs to have at least a recording control unit configured to access the recording medium 110.

The communication unit 111 is an interface used to connect to an external apparatus. The digital camera 100 according to the present exemplary embodiment is able to exchange data with an external apparatus via the communication unit 111. For example, the digital camera 100 can transmit image data generated by the imaging unit 102 to an external apparatus via the communication unit 111. In the present exemplary embodiment, the communication unit 111 includes an interface used to communicate with an external apparatus by a wireless LAN according to the standard IEEE802.11, and the control unit 101 controls the communication unit 111 to implement communication with an external apparatus via the wireless LAN. In the communication via the wireless LAN, the communication unit 111 may directly connect to an external apparatus or may connect to an external apparatus via an access point. Furthermore, as a protocol used to communicate data, for example, Hyper Text Transfer Protocol (HTTP) can be used. Besides, Picture Transfer Protocol over Internet Protocol (PTP/IP) can also be used. Moreover, the communication method is not limited to a wireless LAN, but may be a wireless communication method, such as an infrared communication method, a Bluetooth® communication method, or a wireless universal serial bus (USB). Furthermore, the communication unit 111 may use a wired connection, such as a USB cable, High-Definition Multimedia Interface (HDMI)®, IEEE 1394, or Ethernet.

A near field communication unit 112 is composed of, for example, an antenna for wireless communication, a modulation and demodulation circuit for processing a wireless signal, and a communication controller. The near field communication unit 112 implements near field communication by outputting a modulated wireless signal from the antenna and modulating a wireless signal received via the antenna. In the present exemplary embodiment, the near field communication unit 112 implements near field communication according to the standard ISO/IEC 18092 (called "Near Field Communication (NFC)"). Besides, the near field communication unit 112 may adopt near field communication according to a wireless communication method, such as the infrared communication method, the Bluetooth® communication method, or the wireless universal serial bus (USB). In a case where the near field communication unit 112 adopts the Bluetooth® communication method, for example, Version 4.0 of Bluetooth® Low Energy, which is low in electric power consumption, can be selected. The Bluetooth® communication is narrow in available communication range (in other words, short in available communication distance) as compared with the wireless LAN communication. Furthermore, the Bluetooth® communication is low in communication speed as compared with the wireless LAN communication. On the other hand, the Bluetooth® communication is small in electric power consumption as compared with the wireless LAN communication.

The near field communication unit 112 in the present exemplary embodiment is mounted on the side surface of the digital camera 100.

In the present exemplary embodiment, the digital camera 100 is connected to a smart device 200, which is described below, via the communication unit 111 starting communication. Furthermore, the communication unit 111 of the digital camera 100 in the present exemplary embodiment has an AP mode, in which the communication unit 111 operates as an access point in the infrastructure mode, and a CL mode, in which the communication unit 111 operates as a client in the infrastructure mode. Thus, when the communication unit 111 is caused to operate in the CL mode, the digital camera 100 in the present exemplary embodiment is able to operate as a client device (hereinafter referred to as a "CL device") in the infrastructure mode. In a case where the digital camera 100 operates as a CL device, when the digital camera 100 is connected to an access point device (hereinafter referred to as an "AP device") located in the vicinity of the digital camera 100, the digital camera 100 is able to participate in a network formed by the AP device. Furthermore, when the communication unit 111 is caused to operate in the AP mode, the digital camera 100 in the present exemplary embodiment is able to operate as a simplified AP (hereinafter referred to as a "simple AP") having a more restrictive function than functions of other types of APs. When the digital camera 100 operates as a simple AP, the digital camera 100 itself forms a network. An apparatus located in the vicinity of the digital camera 100 recognizes the digital camera 100 as an AP device, and then becomes able to participate in the network formed by the digital camera 100. Programs for causing the digital camera 100 to operate are stored in the non-volatile memory 103 as mentioned in the foregoing.

Further, the digital camera 100 in the present exemplary embodiment is a type of access point, but is a simple AP that does not have a gateway function for transferring data received from the CL device to an internet provider. Accordingly, even if the digital camera 100 receives data from another apparatus participating in the network formed by the digital camera 100 itself, the digital camera 100 is not able to transfer the received data to a network such as the Internet.

Figure 1B:
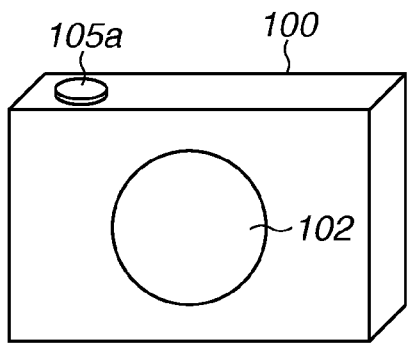
Figure 1C:
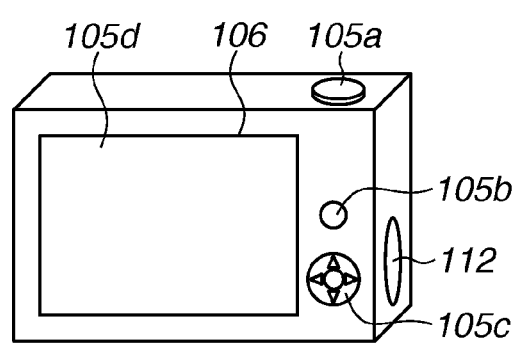

Next, the outer appearance of the digital camera 100 is described. FIGS. 1B and 1C illustrate an example of the outer appearance of the digital camera 100. A release switch 105a, a playback button 105b, arrow keys 105c, and a touch panel 105d constitute the above-mentioned operation member included in the operation unit 105. Furthermore, the display unit 106 is mounted to display an image captured by the imaging unit 102.

Thus far is the description of the digital camera 100.

<Configuration of Smart Device 200>

FIG. 2 is a block diagram illustrating a configuration example of the smart device 200, which is an example of an information processing apparatus according to the present exemplary embodiment. The term "smart device" means a smartphone or a tablet device. While, in the present exemplary embodiment, a smart device is described as an example of an information processing apparatus, the information processing apparatus is not restrictive. For example, the information processing apparatus may be a digital camera, a printer, a television set, or a personal computer each having a wireless communication function.

A control unit 201 controls each unit of the smart device 200 according to an input signal or a program, which is described below. Furthermore, instead of the control unit 201 controlling the entire smart device 200, a plurality of pieces of hardware can share processing to control the entire smart device 200.

An imaging unit 202 converts object light formed by a lens included in the imaging unit 202 into an electrical signal, performs noise reduction processing on the electrical signal, and outputs the processed digital data as image data. The captured image data, after being stored in a buffer, is subjected to a predetermined arithmetic operation and then recorded on a recording medium 210.

A non-volatile memory 203 is an electrically erasable and recordable memory of the non-volatile type. In the non-volatile memory 203, an operating system (OS), which is basic software to be executed by the control unit 201, and applications, which implement applicative functions in cooperation with the OS, are recorded. Furthermore, in the present exemplary embodiment, an application for communicating with the digital camera 100 (hereinafter referred to as a "communication application") is also stored in the non-volatile memory 203.

A work memory 204 is used as an image display memory for a display unit 206 and a work area for the control unit 201.

An operation unit 205 is used to receive an instruction issued by the user to the smart device 200. The operation unit 205 includes, for example, a power button, which is used for the user to issue an instruction for powering on or off the smart device 200, and an operation member such as a touch panel formed on the display unit 206.

The display unit 206 performs displaying of image data and displaying of characters for an interactive operation. The display unit 206 is not necessarily included in the smart device 200. The smart device 200 only needs to be capable of connecting to the display unit 206 and to have at least a display control function for controlling a display operation of the display unit 206.

The recording medium 210 can be used to record image data output from the imaging unit 202. A system adopted for file management in the smart device 200 includes, for example, FAT. The recording medium 210 may be configured to be detachably attachable to the smart device 200 or may be built into the smart device 200. In other words, the smart device 200 only needs to have at least a unit configured to access the recording medium 210.

A communication unit 211 is an interface used to connect to an external apparatus. The smart device 200 according to the present exemplary embodiment is able to exchange data with an external apparatus via the communication unit 211. For example, the smart device 200 can transmit image data generated by the imaging unit 202 to an external apparatus via the communication unit 211. In the present exemplary embodiment, the communication unit 211 includes an interface used to communicate with an external apparatus by a wireless LAN according to the standard IEEE802.11, and the control unit 201 controls the communication unit 211 to implement communication with an external apparatus via the wireless LAN. In the communication via the wireless LAN, the communication unit 211 may directly connect to an external apparatus or may connect to an external apparatus via an access point. Furthermore, as a protocol used to communicate data, for example, HTTP or PTP/IP can be used. Moreover, the communication method is not limited to a wireless LAN, but may be a wireless communication method, such as an infrared communication method, a Bluetooth® communication method, or a wireless universal serial bus (USB). Furthermore, the communication unit 211 may use a wired connection, such as a USB cable, High-Definition Multimedia Interface (HDMI)®, IEEE 1394, or Ethernet.

A near field communication unit 212 is composed of, for example, an antenna for wireless communication, a modulation and demodulation circuit for processing a wireless signal, and a communication controller. The near field communication unit 212 implements near field communication by outputting a modulated wireless signal from the antenna and modulating a wireless signal received via the antenna. In the present exemplary embodiment, the near field communication unit 212 implements near field communication according to the standard ISO/IEC 18092 (called "Near Field Communication (NFC)"). Besides, the near field communication unit 212 may adopt near field communication according to a wireless communication method, such as the infrared communication method, the Bluetooth® communication method, or the wireless universal serial bus (USB). In a case where the near field communication unit 212 adopts the Bluetooth® communication method, for example, Version 4.0 of Bluetooth® Low Energy, which is low in electric power consumption, can be selected. The Bluetooth® communication is narrow in available communication range (in other words, short in available communication distance) as compared with the wireless LAN communication. Furthermore, the Bluetooth® communication is low in communication speed as compared with the wireless LAN communication. On the other hand, the Bluetooth® communication is small in electric power consumption as compared with the wireless LAN communication.

A public network communication unit 213 is an interface used to perform public wireless communication. The smart device 200 is able to be used to perform a telephone conversation with another apparatus via the public network communication unit 213. In this instance, the control unit 201 implements a telephone conversation by inputting and outputting speech signals via a microphone 214 and a speaker 215. Furthermore, in the present exemplary embodiment, the public network communication unit 213 is able to connect to a public network according to the standard W-CDMA (UMTS) or Long Term Evolution (LTE). Moreover, a single antenna can be used for both of the communication unit 211 and the public network communication unit 213.

Thus far is the description of the smart device 200.

<About APIs for Controlling Digital Camera Via External Apparatus>

FIG. 3A illustrates application programming interfaces (APIs) for controlling the digital camera 100 via an external apparatus.

With regard to the digital camera 100 according to the present exemplary embodiment, APIs used to control the digital camera 100 via an external apparatus, such as the smart device 200, are published. The APIs are implemented into both the digital camera 100 and the OS installed on the smart device 200. The designer of an application to be loaded onto an external apparatus can use the published APIs to readily implement a desired function without regard to the detailed procedure. For example, the application only needs to call an API implemented in the OS to attain the acquisition of device information recorded in the non-volatile memory 103 of the digital camera 100 or a content file stored in the recording medium 110. The term "content file" means a file that the digital camera 100 generates and then stores in the recording medium 110 or the non-volatile memory 103, which, in the present exemplary embodiment, indicates a still image file or a moving image file. Furthermore, besides, the digital camera 100 may be configured to be able to provide, to an external apparatus, for example, a sound file, a music file, or a markup language file such as a HyperText Markup Language (HTML) file. In the following, for ease of description, APIs are described with a still image file taken as an example.

The digital camera 100 previously stores the APIs as a program in the non-volatile memory 103. When a communication is established between the digital camera 100 and an external apparatus via the communication unit 111, the digital camera 100 loads a program for executing an API onto the work memory 104 and then waits the API to be requested from the external apparatus. When the control unit 101 detects that the API has been requested from the external apparatus, the digital camera 100 performs processing according to the type of the API and transmits a result of the processing as a response to the external apparatus. The API is executed on a communication protocol prescribed by the digital camera 100, and the external apparatus communicates with the digital camera 100 using the prescribed communication protocol to request the API. In the present exemplary embodiment, it is supposed that the API is executed on HyperText Transfer Protocol (HTTP). However, another communication protocol (for example, PTP/IP) may be adopted.

The method for executing the API in HTTP is implemented basically in the following procedure. First, the external apparatus describes, in text, the API name and a required argument on an HTTP request body and transmits the HTTP request body to the digital camera 100 using a GET method or a POST method, thus requesting execution of the API. In response to this request, the digital camera 100 adds a result of execution of the API to the HTTP request body and transmits, as a response, the resultant HTTP request body to the external apparatus, thus providing the result of execution of the API to the external apparatus. In the following description, performing processing for transmitting a request using the API is also referred to as "calling the API".

An API list 300 illustrated in FIG. 3A is obtained by tabling the types and descriptions of APIs that the digital camera 100 operating in the above-described scheme provides. APIs described below are merely examples, and other than the following APIs may be provided as APIs for controlling the digital camera 100.

An API 301 is an API for acquiring product information about the digital camera 100. When the external apparatus requests the API name "RequestProductInfo" without any argument to the digital camera 100, the external apparatus can acquire, as a response from the digital camera 100, the product name, manufacturer name, firmware version, and serial number of the digital camera 100. The term "product name" means the name of products of the digital camera 100. The term "manufacturer name" means the name of a maker of the digital camera 100. The term "firmware version" means the version number of a program for controlling the digital camera 100, which is stored in the non-volatile memory 103. The term "serial number" means a unique number enabling individually identifying the digital camera 100.

An API 302 is an API for acquiring information about a storage region of the digital camera 100. When the external apparatus requests the API name "RequestMemoryInfo" to the digital camera 100, the external apparatus can acquire, as a response from the digital camera 100, the storage region ID, available storage capacity, free space, and number of stored content files of the digital camera 100. This request is performed without any argument. The term "storage region ID" means an identification (ID) assigned to each region in which a content file generated by the digital camera 100 is storable. The region in which a content file is storable is, for example, the recording medium 110 of the digital camera 100, and the ID is assigned to the recording medium 110. If a plurality of recording media can be inserted into the digital camera 100, different IDs are assigned to the respective recording media. The term "available storage capacity" is the upper limit size of a storage region in which content files are storable. The term "free space" is the size of a space in which no content file is stored of the storage region. The term "number of stored content files" means the total of content files that are stored in the storage region.

An API 303 is an API for acquiring a content ID and management information about a content file stored in the storage region of the digital camera 100. The management information is recorded in a management region (a region allocated to each directory, called a "directory entry") for managing files inside a directory in which content is recorded and information about the directory. When the external apparatus requests the API name "RequestContentInfo" with the arguments of the storage region ID acquired in the API 302, type of content format, and number of acquisition requests to the digital camera 100, the external apparatus can acquire, as a response from the digital camera 100, the content ID, file name, file size, and file generation date and time of a content file stored in the storage region of the digital camera 100. The term "content ID" as used herein means an ID automatically assigned by the control unit 101 of the digital camera 100 for individually identifying the content file. Furthermore, besides IDs used for file management in the digital camera 100, IDs to be temporarily used during the process of communication with the smart device 200 using the API 303 may be separately assigned, and the assigned IDs may be used as content IDs.

An API 304 is an API for acquiring a content file stored in the storage region of the digital camera 100. When the external apparatus requests the API name "RequestContent" with the arguments of the content ID and type of content size, the external apparatus can acquire a content file as a response from the digital camera 100. The type of content size to be specified includes, for example, an original size and a reduced size. Then, the digital camera 100 generates a content file with the specified size and transmits the generated content file to the external apparatus as a response. In the present exemplary embodiment, the type of content size can be used to specify, for example, whether to acquire a still image file in an original size or in a thumbnail size. If the original size is specified, the external apparatus acquires image data recorded in the digital camera 100. If the thumbnail size is specified, the external apparatus acquires a thumbnail recorded in the header of image data recorded in the digital camera 100.

An API 305 is an API for acquiring detail information (called "metadata") about a content file stored in the storage region of the digital camera 100. When the external apparatus requests the API name "RequestContentDetailInfo" with the argument of the content ID, the external apparatus can acquire detail information about a content file corresponding to the specified content ID. In a case where the API 305 is used, the external apparatus acquires detail information about content without receiving the content itself. The term "detail information" as used in the present exemplary embodiment means metadata, which is, for example, Exif information about a still image file. Exif is an abbreviation of Exchangeable image file format, which is a format of image metadata for digital cameras formulated by the Japan Electronic Industries Development Association (JEIDA). Since Exif information is information recorded in the header of image data, reading and analysis of the header of image data are required to comprehend the content of Exif information. Furthermore, according to the implementation of this API, since the digital camera 100 can analyze the header of image data and the smart device 200 can acquire metadata in interpretable format, the smart device 200 does not need to analyze Exif information about image data. In other words, for example, even if the external apparatus does not have a function for analyzing Exif information about image data received with the use of the API 304, the external apparatus can acquire metadata by receiving the metadata from the digital camera 100. Furthermore, it takes a certain amount of time to analyze the header of image data. Therefore, the time required until the digital camera 100 becomes able to transmit the metadata is long as compared with management information recorded in a directory entry.

Now, the configuration of image data in the present exemplary embodiment is described. FIG. 3B is a conceptual diagram illustrating a configuration of image data in the present exemplary embodiment. The image data is generated by, for example, the digital camera 100 and is then recorded in a data recording region of the recording medium 110.

In the data structure of an image file in the present exemplary embodiment, Exif-JPEG is used as the image file format. However, other image formats having a data structure in which metadata is allowed to be recorded in an image file, such as Exif-TIFF, RAW image, and moving image, may be adopted.

In Exif-JPEG 310 illustrated in FIG. 3B, SOI 311 is a marker indicating the start of Exif-JPEG 310. APP1 312 is an application marker corresponding to the header portion of Exif-JPEG 310. A data block 313 is composed of a quantization table (DQT), a Huffman table (DHT), a frame start marker (SOF), and a scan start marker (SOS). Compressed Data 314 is compressed data of a main image. EOI 313 is a marker indicating the end of Exif-JPEG 310.

Furthermore, APP1 312 is composed of data blocks 316 to 322 such as those illustrated in FIG. 3B. The data block 316 is composed of APP1 Length, which indicates the size of APP1 312, and Exif Identifier Code, which indicates an identification code of APP1 312. 0th IFD 317 is a data block in which to record ancillary information concerning the compressed main image. For example, the ancillary information includes information on the model name of a digital camera used to capture image data. Data blocks of Exif IFD 318 and GPS IFD 320 exist in a part of 0th IFD 317.

Exif IFD 318 is composed of a tag about the Exif version, a tag about the characteristic and structure of image data, a tag about the shooting date and time, and a tag about shooting conditions in which the shutter speed, lens focal length, etc., have been recorded. Furthermore, a data block of MarkerNote 319 exists in a part of Exif IFD 318. In MarkerNote 319, there is recorded information unique to a maker having generated the file. For example, the recorded information includes time difference information and a serial number, which indicates a number unique to the digital camera 100 used to capture image data. Information described in MarkerNote 319 is defined according to a specification individually specific to each maker. Therefore, as long as the specification of a format of data recorded in MarkerNote 319 is not published, it is difficult to comprehend information recorded in MarkerNote 319 via products or applications of other makers. API 305 can also be used to solve such an issue. In other words, the use of the API 305 enables the analysis of MarkerNote 319 to be performed by the digital camera 100 and also enables the smart device 200 to acquire data in a recognizable form. Therefore, even if an apparatus or application using an API does not have a function of analyzing MarkerNote 319, it can comprehend the content of information recorded in MarkerNote 319.

GPS IFD 320 is composed of a tag about global positioning system (GPS) information. In GPS IFD 320, there are recorded position information, such as the latitude and longitude, which is used in the present exemplary embodiment, and satellite positioning date and time (Coordinated Universal Time (UTC)).

1st IFD 321 is a data block in which to record ancillary information concerning a thumbnail image. Thumbnail 322 is image data of the thumbnail image.

Thus far is the description of image data in the present exemplary embodiment.

<Sequence of System>

Next, the procedure for viewing image data, which is implemented by the digital camera 100 and the smart device 200 operating in cooperation with each other according to the present exemplary embodiment, is described.

FIG. 4 is a sequence diagram illustrating the procedure for viewing image data, which is implemented by the digital camera 100 and the smart device 200 operating in cooperation with each other according to the present exemplary embodiment.

First, in step S401, the digital camera 100 and the smart device 200 share communication parameters with each other and participate together in the same network. The network in which the two apparatuses participate may be a network generated by an access point that is an apparatus other than the two apparatuses, or may be a network generated by either one of the two apparatuses operating as a simple access point (AP). In the present exemplary embodiment, a case where the digital camera 100 operates as a simple AP to form a wireless LAN network is taken as an example for description. When the digital camera 100 operates as a simple AP, the digital camera 100 starts periodically transmitting a beacon signal. On the other hand, when the smart device 200 is instructed by a menu operation to start connection, the smart device 200 detects the beacon signal and participates in the wireless LAN network formed by the digital camera 100. The sharing of communication parameters is implemented by the user operating the two apparatuses (for example, the user selecting a service set identifier (SSID) at the smart device 200 and performing a menu operation to instruct the digital camera 100 to start a wireless LAN function). Alternatively, the sharing of communication parameters may be implemented by the digital camera 100 transmitting an SSID or password to the smart device 200 via near field communication. In this case, the wireless LAN function is automatically started in response to sharing of the SSID or password via near field communication.

Next, in step S402, the digital camera 100 and the smart device 200 discover each other using a device discovery protocol and make protocol connection for performing data communication, thus completing connection of the two apparatuses. The protocol used to mutually discover the two apparatuses includes, for example, Universal Plug and Play (UPnP) and Multicast Domain Name Service (mDNS). Furthermore, the protocol used to perform data communication includes, for example, PTP/IP.

Next, in step S403, the smart device 200 calls a RequestProductInfo API, which is used to acquire product information, to the digital camera 100. In other words, the smart device 200 requests product information from the digital camera 100.

In response to that request, in step S404, the digital camera 100 performs processing corresponding to RequestProductInfo illustrated in FIG. 3A, and transmits a result of the processing to the smart device 200. In this instance, in response to the reception of the request, the digital camera 100 reads out the product name, manufacturer name, firmware version, and serial number, which are stored in the non-volatile memory 103, and transmits the read-out information as product information to the smart device 200.

In subsequent step S405, the smart device 200 calls, to the digital camera 100, a RequestMemoryInfo API for acquiring information about a storage region. In other words, the smart device 200 requests information about a storage region from the digital camera 100.

In response to that request, in step S406, the digital camera 100 performs processing corresponding to RequestMemoryInfo illustrated in FIG. 3A, and transmits a result of the processing to the smart device 200. More specifically, the digital camera 100 transmits, to the smart device 200, the storage region ID, available storage capacity, free space, and number of stored content files, as the information about a storage region.

Next, in step S407, to display a list of thumbnails, the smart device 200 calls, to the digital camera 100, a RequestContentInfo API for acquiring management information about an image stored in the digital camera 100. In other words, the smart device 200 requests management information about the stored image from the digital camera 100. In the calling of the RequestContentInfo API in step S407, the information about a storage region acquired in step S406 is used as arguments. Furthermore, processing in step S407 may be automatically executed in response to the completion of step S406, or may be executed in response to the reception of an instruction to display a list of thumbnails, which is, for example, issued by the user operation. In the case illustrated in FIG. 4, processing in step S407 is executed in response to an instruction from the user.

In response to that request, in step S408, the digital camera 100 performs processing corresponding to RequestContentInfo illustrated in FIG. 3A, and transmits a result of the processing to the smart device 200. More specifically, the digital camera 100 reads out the content ID, content file name, content file size, and content file generation date and time from the directory entry of a directory in which the image is stored, and transmits the read-out information to the smart device 200.

Processing in steps S407 and S408 is repeated a number of times corresponding to the number of thumbnails to be displayed on the display unit 206 of the smart device 200. In the example illustrated in FIG. 4, fifteen thumbnails acquired in a step described below are displayed on one screen. In this case, steps S407 and S408 are repeated fifteen times, and the smart device 200 acquires management information about images corresponding to the thumbnails to be displayed on one screen. Furthermore, the digital camera 100 and the smart device 200 may be configured to allow the smart device 200 to acquire a plurality of pieces of management information only by once calling a RequestContentInfo API. In this case, the smart device 200 specifies a range of pieces of management information to be acquired, as one of arguments of the RequestContentInfo API. More specifically, the smart device 200 specifies the range as "acquisition target range 1-15". If the range is specified in such a way, the digital camera 100 returns, as a response, fifteen pieces of management information, which are from management information about the first image to management information about the fifteenth image among pieces of management information about images that are managed in a predetermined order. For example, the digital camera 100 returns the fifteen pieces of management information in order of generation of images.

The management information being acquired by the smart device 200 is equivalent to an image ID being acquired. In other words, there occurs the possibility that a request with the image ID used as an argument is to be executed. For example, there occurs the possibility that the detail information about a predetermined image is requested. Therefore, in the present exemplary embodiment, in response to the reception of the request in step S407, the digital camera 100 performs processing in step S409.

In step S409, the digital camera 100 reads out detail information about an image the management information about which has been requested in step S407, by analyzing the header region of the image, and retains the read-out detail information in the work memory 104. In a case where a plurality of pieces of management information is requested at one time, also in step S409, the digital camera 100 retains a plurality of pieces of detail information. Accordingly, when detail information about an image is later requested by the smart device 200, the digital camera 100 can transmit the detail information about the image to the smart device 200 even without reading and analyzing the detail information about the image. Thus, a period of time required from the time when the digital camera 100 receives an instruction to the time when the digital camera 100 transmits the detail information to the smart device 200 can be shortened.

Next, in step S410, the smart device 200 calls a RequestContent API for acquiring a thumbnail to be displayed, based on the management information about the image received from the digital camera 100 in step S408. In other words, the smart device 200 requests a thumbnail of the image from the digital camera 100 using, as an argument, the ID of the image the management information about which has been acquired.

In response to that request, in step S411, the digital camera 100 performs processing corresponding to RequestContent illustrated in FIG. 3A, and transmits thumbnail data to the smart device 200. More specifically, the digital camera 100 reads out thumbnail data by analyzing the header of an image determined based on the ID of the image included in the arguments of the called API, and transmits the read-out thumbnail data to the smart device 200.

Next, in step S412, the smart device 200 calls a RequestContentDetailInfo API for acquiring detail information about an image corresponding to the thumbnail requested in step S410. More specifically, the smart device 200 uses, as an argument, an image ID corresponding to the thumbnail requested in step S410, and requests detail information about an image specified by the image ID from the digital camera 100.

In response to that request, in step S413, the digital camera 100 performs processing corresponding to RequestContentDetailInfo illustrated in FIG. 3A, and transmits detail information about the image to the smart device 200. Furthermore, since the detail information requested in step S412 has already been analyzed and read out in step S409, the digital camera 100 can transmit the detail information to the smart device 200 earlier than in a case where the digital camera 100 starts the analysis and reading only after receiving the request in step S412.

Processing in steps S410 to S413 is repeated the same number of times as the number of times processing in steps S407 and S408 has been repeated. Furthermore, the thumbnails and the pieces of detail information acquired by repeating the processing in steps S410 to S413 are sequentially displayed on the display unit 206 of the smart device 200 without waiting for the completion of repeating the processing. As a result of this, for example, on the display unit 206 of the smart device 200, a list of thumbnails and metadata such as that displayed on a screen 421 is displayed. The metadata to be displayed includes, for example, the shooting mode, shooting date and time, shooting location, aperture value (Av), shutter speed value (Tv), and ISO value.

Furthermore, management information, thumbnails, and detail information about images other than the images corresponding to the thumbnails displayed on the screen 421 can be acquired by further performing processing in steps S407 to S413 when an instruction to display other thumbnails is input. Moreover, on a thumbnail list display screen, an instruction to display another thumbnail can be input, for example, by performing a touch operation onto the touch panel. For updating of the thumbnail list, for example, the screen is updated in such a display form that, according to an upward drag operation or flick operation, the currently displayed thumbnails are scrolled out upward and a new subsequent thumbnail group is scrolled in from below. In this case, according to the processing in steps S407 to S413, the smart device 200 acquires management information, thumbnails, and detail information about the subsequent thumbnail group. Furthermore, in an operation of the present exemplary embodiment, the detail information retained in step S409 is once deleted from the work memory 104 as the new subsequent thumbnail group is displayed. For example, the detail information is deleted from the work memory 104 in response to the reception of RequestContentInfo for acquiring management information about another image in step S407 performed the second time. Then, as step S409 is again performed, detail information about an image corresponding to the new thumbnail is retained. Furthermore, the timing at which to once delete the retained detail information is not limited to the above-mentioned timing. For example, in the present exemplary embodiment, all of the pieces of detail information retained in step S409 are basically transmitted to the smart device 200 in step S413. Therefore, the pieces of detail information may be sequentially deleted in order of detail information completely transmitted to the smart device 200.

Moreover, in a state in which the screen 421 is displayed, the user can select a desired thumbnail via the operation unit 205 and check for a main image corresponding to the selected thumbnail. In the following description, an operation in a case where a touch panel is adopted as the operation unit 205 is taken as an example.

In step S414, the smart device 200 accepts an instruction to preview an image among the thumbnails displayed on the screen 421. For example, the user can input an instruction to display a main image corresponding to a thumbnail, by touching a display area of the thumbnail for a predetermined time or more (by performing a long-press operation on the display area). The long-press operation is merely an example, and may be another operation. For example, such an operation as tapping, double-tapping (tapping performed twice within a predetermined time), or tapping with two fingers on the thumbnail may be adopted.

Now, in step S415, the smart device 200, when accepting an instruction to preview an image, calls a RequestContent API using the ID of the image subjected to the instruction as an argument. In this instance, a value indicating "original size" is used as the argument of image size.

In response to that request, in step S416, the digital camera 100 performs processing corresponding to RequestContent illustrated in FIG. 3A, and transmits image data to the smart device 200. In other words, the digital camera 100 transmits, to the smart device 200, image data corresponding to an image ID included in the request.

The smart device 200, having received the transmission, previews the selected image on a display thereof, based on the image data received from the digital camera 100. As a result of this, for example, a single image such as that displayed on a screen 422 is displayed on the operation unit 206 of the smart device 200.

Thus far is the description of the procedure for viewing image data, which is implemented by the digital camera 100 and the smart device 200 operating in cooperation with each other in the present exemplary embodiment.

<Operation of Digital Camera 100>

Figure 5:
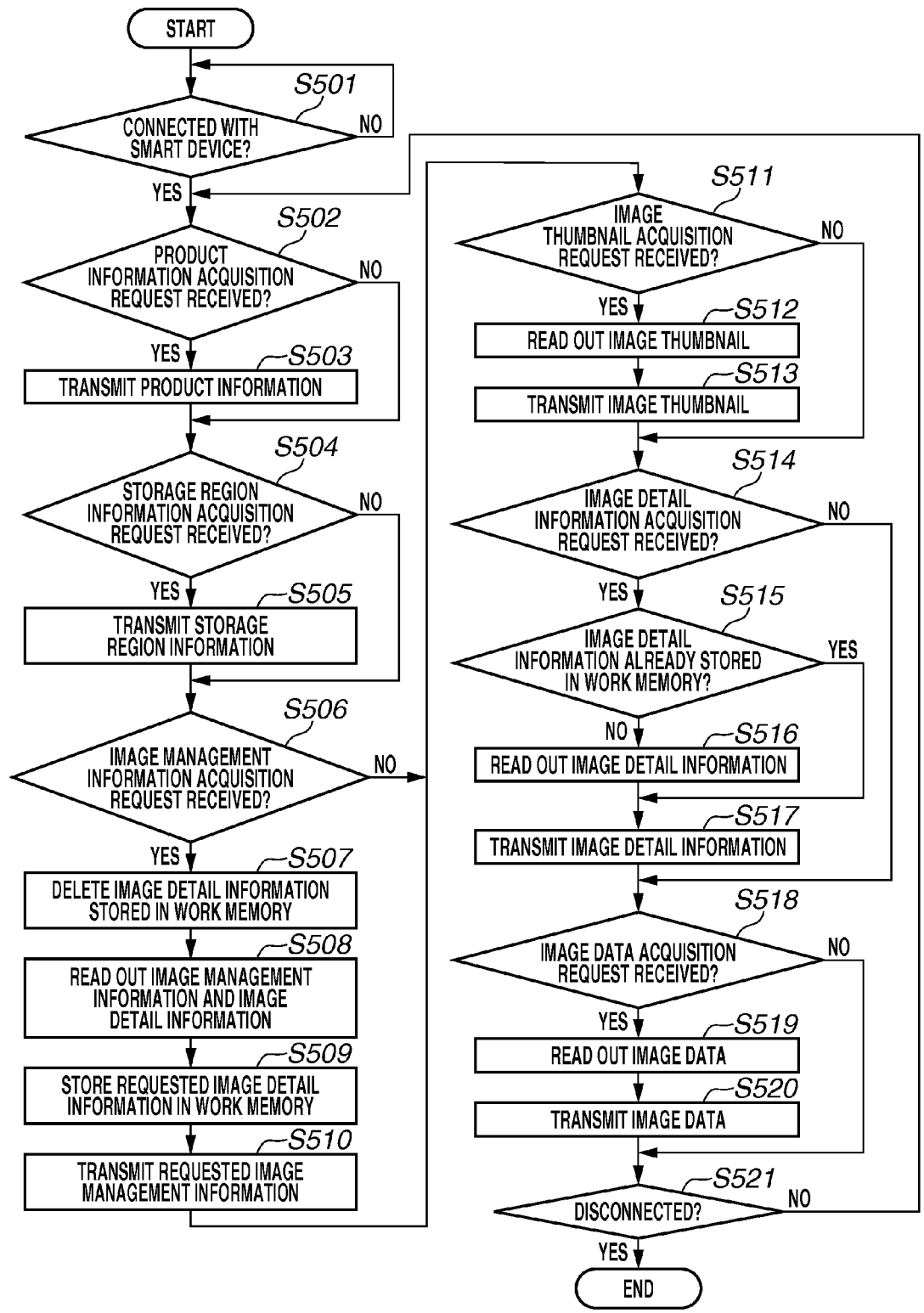
FIG. 5 is a flowchart illustrating an operation of the digital camera according to the first exemplary embodiment.

Next, an operation of the digital camera 100 for implementing the procedure illustrated in FIG. 4 is described. FIG. 5 is a flowchart illustrating the operation of the digital camera 100 according to the present exemplary embodiment. Each processing operation in the flowchart of FIG. 5 is implemented by the control unit 101 loading a program stored in the non-volatile memory 103 onto the work memory 104 and executing the program. Furthermore, the processing in the flowchart of FIG. 5 is started in response to the reception of an instruction issued by, for example, a menu operation of the user to establish a wireless LAN communication with the smart device 200.

First, in step S501, the control unit 101 determines, via the communication unit 111, whether a wireless LAN communication with the smart device 200 has been established. The establishment of the wireless LAN communication means that, after an instruction to start a wireless LAN communication is input to the digital camera 100, a network is generated, devices are searched for within the network, and then an inter-device communication with the smart device 200 is established. If the wireless LAN communication has not been established (NO in step S501), the control unit 101 repeats processing in step S501 while waiting for the establishment of the wireless LAN communication. On the other hand, if the wireless LAN communication has been established (YES in step S501), the processing proceeds to step S502. The processing in step S501 corresponds to steps S401 and S402 illustrated in FIG. 4.

Next, in step S502, the control unit 101 determines, via the communication unit 111, whether a request RequestProductInfo for acquiring product information about the digital camera 100 has been received from the smart device 200. If the control unit 101 determines that the request RequestProductInfo has been received (YES in step S502), the processing proceeds to step S503. If the control unit 101 determines that the request RequestProductInfo has not been received (NO in step S502), the processing proceeds to step S504 without passing through step S503.

In step S503, in response to the received request, the control unit 101 reads out the product name, manufacturer name, firmware version, and serial number, which are recorded in the non-volatile memory 103, and then transmits such product information as a response to the smart device 200. The processing in step S503 corresponds to step S404 illustrated in FIG. 4.

Next, in step S504, the control unit 101 determines, via the communication unit 111, whether a request RequestMemoryInfo for acquiring information about the storage region of the digital camera 100 has been received from the smart device 200. If the control unit 101 determines that the request RequestMemoryInfo has been received (YES in step S504), the processing proceeds to step S505. If the control unit 101 determines that the request RequestMemoryInfo has not been received (NO in step S504), the processing proceeds to step S506 without passing through step S505.

In step S505, in response to the received request, the control unit 101 transmits the storage region ID, available storage capacity, free space, and number of stored content files as a response to the request RequestMemoryInfo to the smart device 200 via the communication unit 111. The processing in step S505 corresponds to step S406 illustrated in FIG. 4.

Next, in step S506, the control unit 101 determines, via the communication unit 111, whether a request RequestContentInfo for acquiring management information about an image stored in the digital camera 100 has been received from the smart device 200. If the control unit 101 determines that the request RequestContentInfo has been received (YES in step S506), the processing proceeds to step S507. If the control unit 101 determines that the request RequestContentInfo has not been received (NO in step S506), the processing proceeds to step S511. Step S511 is described below.

In step S507, the control unit 101 deletes detail information about an image stored in the work memory 104. As the case where detail information about an image is stored in the work memory 104 at this point of time, there may be a case where, for example, while a list of thumbnails is once displayed on the smart device 200, an instruction has been issued to display a new group of thumbnails. Additionally, if no detail information about an image is stored, the processing in step S507 is skipped. Moreover, if, in step S506, management information about an image the detail information about which is already stored has been requested, the control unit 101 does not delete the detail information about the image the management information about which has been requested. For example, consider a state in which, for example, "1-15" is specified as the argument for specifying the range in the request RequestContentInfo and the respective pieces of detail information about the first to fifteenth images are once stored. In a case where, in this state, a further request RequestContentInfo in which "10-25" is specified as the argument for range specification has been received, it is determined that the respective pieces of detail information about the tenth to fifteenth images are already stored. In such a case, the control unit 101 does not delete the respective pieces of detail information about the tenth to fifteenth images.

In step S508, the control unit 101 reads out, from the directory entry, management information about a specified image among the management information stored in the recording medium 110, and also reads out detail information about the image by analyzing the header of the image.

Next, in step S509, the control unit 101 stores, in the work memory 304, the detail information about the image read out in step S508. Since, in this way, detail information having the possibility of being requested along with the acquisition of the management information is read out in advance, a response speed required when the detail information is requested can be increased. The processing in steps S508 and S509 corresponds to step S409 illustrated in FIG. 4.

Next, in step S510, the control unit 101 transmits, to the smart device 200 via the communication unit 111, the management information read out in step S508 as a response to the request RequestContentInfo. Furthermore, processing in step S510 and processing in step S509 may be changed in their order or may be performed in parallel. The processing in step S510 corresponds to step S408 illustrated in FIG. 4.

Next, in step S511, the control unit 101 determines, via the communication unit 111, whether a thumbnail acquisition request for the image has been received from the smart device 200. More specifically, the control unit 101 determines whether a request RequestContent with the argument of THUMBNAIL has been received. If the control unit 101 determines that the thumbnail acquisition request has been received (YES in step S511), the processing proceeds to step S512. If the control unit 101 determines that the thumbnail acquisition request has not been received (NO in step S511), the processing proceeds to step S514. Step S514 is described below.

In step S512, the control unit 101 reads out a thumbnail by analyzing the header of the image subjected to the thumbnail acquisition request.

Next, in step S513, the control unit 101 transmits the thumbnail of the image read out in step S512 as a response to the request RequestContent to the smart device 200 via the communication unit 111. The processing in step S513 corresponds to step S411 illustrated in FIG. 4.

Next, in step S514, the control unit 101 determines, via the communication unit 111, whether an acquisition request for detail information about the image has been received. More specifically, the control unit 101 determines whether a request RequestContentDetailInfo has been received. If the control unit 101 determines that the request RequestContentDetailInfo has been received (YES in step S514), the processing proceeds to step S515. If the control unit 101 determines that the request RequestContentDetailInfo has not been received (NO in step S514), the processing proceeds to step S518. Step S518 is described below.

In step S515, the control unit 101 determines whether metadata of the image requested from the smart device 200 is already stored in the work memory 104. If the control unit 101 determines that the metadata is not stored (NO in step S515), then in step S516, the control unit 101 reads out the metadata by analyzing the header of the image. If the control unit 101 determines that the metadata is already stored (YES in step S515), the processing proceeds to step S517 without passing through step S516.

In step S517, the control unit 101 transmits the requested detail information about the image as a response to the request RequestContentDetailInfo to the smart device 200 via the communication unit 111. The processing in step S517 corresponds to step S413 illustrated in FIG. 4. Here, in a case where step S517 is performed without passing through step S516, the control unit 101 can transmit the already stored detail information. In this case, since step S516 is not required to be performed, a period of time required from the reception of the request to the transmission of the metadata can be shortened as compared with a case where step S516 is performed.

Next, in step S518, the control unit 101 determines, via the communication unit 111, whether an image data acquisition request has been received. More specifically, the control unit 101 determines whether a request RequestContent with the argument of ORIGINAL has been received. If the control unit 101 determines that the image data acquisition request has been received (YES in step S518), the processing proceeds to step S519. If the control unit 101 determines that the image data acquisition request has not been received (NO in step S518), the processing proceeds to step S521. Step S521 is described below.

In step S519, the control unit 101 reads out, from the recording medium 110, the image data requested from the smart device 200.

Next, in step S520, the control unit 101 transmits the image data read out in step S519 as a response to the request RequestContent to the smart device 200 via the communication unit 111. The processing in step S520 corresponds to step S416 illustrated in FIG. 4.

Next, in step S521, the control unit 101 determines whether the wireless LAN communication with the smart device 200 has been disconnected. As the case where the wireless LAN communication is disconnected, there may be a case where an instruction expressly issued by the user to disconnect the wireless LAN communication has been accepted or a case where no signal from the smart device 200 is received for a predetermined time or more. If it is determined that the wireless LAN communication has not been disconnected (NO in step S521), the processing returns to step S502. On the other hand, if it is determined that the wireless LAN communication has been disconnected (YES in step S521), the control unit 101 deletes the detail information stored in step S509, and then ends the processing in the flowchart of FIG. 5.

Thus far is the description of the operation of the digital camera 100 according to the present exemplary embodiment.

<Operation of Smart Device 200>

Figure 6:
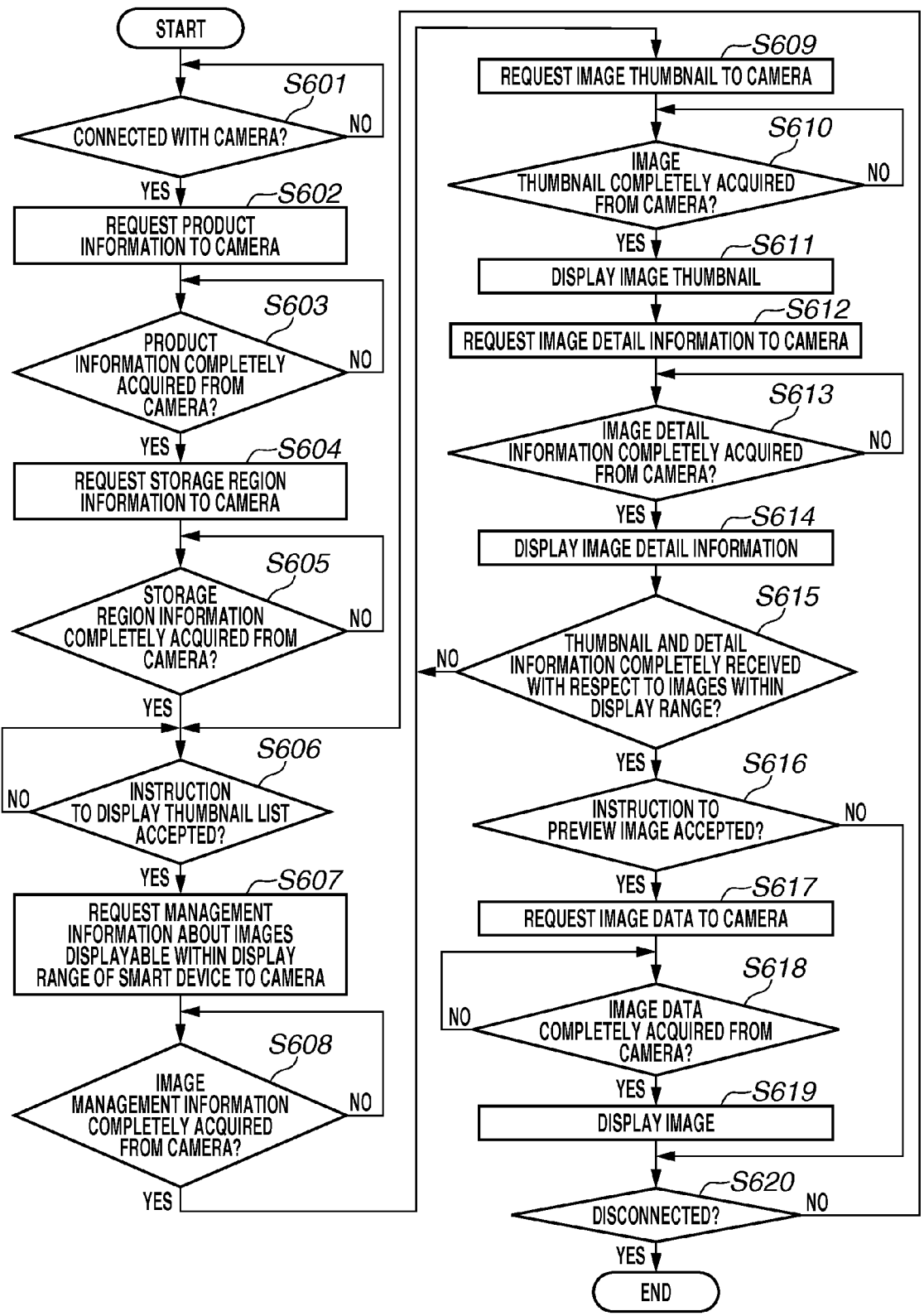
FIG. 6 is a flowchart illustrating an operation of the smart device according to the first exemplary embodiment.

Next, an operation of the smart device 200 for implementing the procedure illustrated in FIG. 4 is described. FIG. 6 is a flowchart illustrating the operation of the smart device 200 according to the present exemplary embodiment. Each processing operation in the flowchart of FIG. 6 is implemented by the control unit 201 loading a program stored in the non-volatile memory 203 onto the work memory 204 and executing the program. Furthermore, the processing in the flowchart of FIG. 6 is started in response to the reception of an instruction issued by, for example, a menu operation of the user to establish a wireless LAN communication with the digital camera 100.

First, in step S601, the control unit 201 determines, via the communication unit 211, whether a wireless LAN communication with the digital camera 100 has been established. The establishment of the wireless LAN communication means that, after an instruction to start a wireless LAN communication is input to the smart device 200, the smart device 200 participates in a network generated by the digital camera 100, devices are searched for within the network, and then an inter-device communication with the digital camera 100 is established. If the wireless LAN communication has not been established (NO in step S601), the control unit 201 repeats processing in step S601 while waiting for the establishment of the wireless LAN communication. On the other hand, if the wireless LAN communication has been established (YES in step S601), the processing proceeds to step S602. The processing in step S601 corresponds to steps S401 and S402 illustrated in FIG. 4.

Next, in step S602, the control unit 201 transmits, to the digital camera 100 via the communication unit 211, a request RequestProductionInfo for acquiring product information about the digital camera 100. The product information transmitted in step S602 is received by the digital camera 100 in step S502 illustrated in FIG. 5. The processing in step S602 corresponds to step S403 illustrated in FIG. 4.

In step S603, the control unit 201 determines whether a response to the request transmitted in step S602 has been received. If it is determined that the response has not been received (NO in step S603), the control unit 201 repeats processing in step S603 while waiting for the reception of the response. If it is determined that the response has been received (YES in step S603), the processing proceeds to step S604. Furthermore, information indicated by the response to be received includes the product name, manufacturer name, firmware version, and serial number of the digital camera 100. Such information is displayed on the display unit 206 to be used to present information such as the product name to the user or to allow the user to determine the characteristics of the product.

In step S604, the control unit 201 transmits, to the digital camera 100 via the communication unit 211, a request for acquiring information about the storage region of the digital camera 100. More specifically, the control unit 201 transmits a request RequestMemoryInfo. The information transmitted in step S604 is received by the digital camera 100 in step S504 illustrated in FIG. 5. The processing in step S604 corresponds to step S405 illustrated in FIG. 4.

In step S605, the control unit 201 determines whether a response to the request transmitted in step S604 has been received from the digital camera 100. If it is determined that the response has not been received (NO in step S605), the control unit 201 repeats processing in step S605 while waiting for the reception of the response. If it is determined that the response has been received (YES in step S605), the processing proceeds to step S606. Furthermore, information indicated by the response to be received includes the storage region ID, available storage capacity, free space, and number of stored content files. Based on such information, the smart device 200 can recognize the number of content files stored in the recording medium 110 of the digital camera 100 and the ID of a storage region for accessing a storage. Then, by recognizing the number of content files, the smart device 200 can determine to what extent to assure a display region of the display unit 206.

Next, in step S606, the control unit 201 determines, via the operation unit 205, whether an instruction to display a list of thumbnails has been accepted from the user. If the control unit 201 determines that the instruction has been accepted (YES in step S606), the processing proceeds to step S607. If the control unit 201 determines that the instruction has not been accepted (NO in step S606), the control unit 201 repeats processing in step S606 while waiting for the reception of the instruction.

In step S607, the control unit 201 requests, to the digital camera 100 via the communication unit 211, a number of pieces of management information displayable on the display unit 206. More specifically, the control unit 201 transmits a request RequestContentInfo to the digital camera 100. Here, the ID of the storage region acquired in step S605 is specified as the argument of the request RequestContentInfo. The processing in step S607 corresponds to step S407 illustrated in FIG. 4.

Next, in step S608, the control unit 201 determines, via the communication unit 211, whether the management information has been completely acquired from the digital camera 100. If it is determined that the management information has not been completely acquired (NO in step S608), the control unit 201 repeats processing in step S608 while waiting for the completion of acquisition of the management information. If it is determined that the management information has been completely acquired (YES in step S608), the processing proceeds to step S609. Here, information acquired as the management information includes a content ID. The content ID is information for identifying an image, which is used to request a main image or detail information.

In step S609, the control unit 201 requests a thumbnail of the image to the digital camera 100 via the communication unit 211. More specifically, the control unit 201 transmits, to the digital camera 100, a request RequestContent with the argument of THUMBNAIL for image size. The processing in step S609 corresponds to step S410 illustrated in FIG. 4.

In step S610, the control unit 201 determines, via the communication unit 211, whether the thumbnail requested in step S609 has been completely acquired. If it is determined that the thumbnail has not been completely acquired (NO in step S610), the control unit 201 repeats processing in step S610 while waiting for the completion of acquisition of the thumbnail. If it is determined that the thumbnail has been completely acquired (YES in step S610), the processing proceeds to step S611.

In step S611, the control unit 201 displays the thumbnail of the image on the display unit 206.

Then, in step S612, the control unit 201 requests detail information about the image to the digital camera 100 via the communication unit 211. More specifically, the control unit 201 transmits, to the digital camera 100, a request RequestContentDetailInfo with the argument of the image ID of the image corresponding to the thumbnail requested in step S609. The processing in step S612 corresponds to step S412 illustrated in FIG. 4.

Next, in step S613, the control unit 201 determines, via the communication unit 211, whether the detail information has been completely acquired from the digital camera 100. If it is determined that the detail information has not been completely acquired (NO in step S613), the control unit 201 repeats processing in step S613 while waiting for the completion of acquisition of the detail information. If it is determined that the detail information has been completely acquired (YES in step S613), the processing proceeds to step S614.

In step S614, the control unit 201 displays the detail information received in step S613 on the display unit 206. Here, the detail information about the image acquired from the digital camera 100 includes such detail information about a captured image as the aperture value and shutter speed. The user can refer to such information to select, for example, an image to be previewed or an image to be loaded into the smart device 200.

Then, in step S615, the control unit 201 determines whether the thumbnail and detail information have been completely acquired with respect to all of the images within the display range of the display unit 206. For example, in a case where fifteen thumbnails are displayed within the display range, the control unit 201 determines whether fifteen thumbnails and fifteen pieces of detail information have been completely acquired. If it is determined that the thumbnail and detail information have not been completely acquired (NO in step S615), the processing returns to step S609, so that the control unit 201 repeats steps S609 to S614 to acquire and display the remaining thumbnails and detail information. In this way, each time a thumbnail is acquired and displayed, detail information about an image corresponding to the thumbnail is acquired and displayed. As a result, while a thumbnail and detail information are alternately displayed, a list screen displaying a list of thumbnails and detail information, such as the screen 421 illustrated in FIG. 4, is finally displayed. Although, in the present exemplary embodiment, a case where a thumbnail and detail information are alternately displayed is taken as an example, this is not restrictive. For example, all of the thumbnails of images within the display range may be first acquired, and, after only the thumbnails are sequentially displayed, pieces of management information may be sequentially acquired and displayed. If all of the thumbnails and detail information to be displayed have been completely acquired as a result of repetition of steps S609 to S614 (YES in step S615), the processing proceeds to step S616.

Next, in step S616, the control unit 201 determines, via the operation unit 205, whether an instruction to preview an image has been accepted from the user. For example, when a position on the touch panel corresponding to the display region of a thumbnail has continued to be touched for a predetermined time or more, the control unit 201 determines that an instruction to preview an image corresponding to the thumbnail has been accepted. If the control unit 201 determines that the instruction has been accepted (YES in step S616), the processing proceeds to step S617. If the control unit 201 determines that the instruction has not been accepted (NO in step S616), the processing proceeds to step S620. Step S620 is described below.

In step S617, the control unit 201 requests image data to the digital camera 100 via the communication unit 211. More specifically, the control unit 201 transmits a request RequestContent with the argument of ORIGINAL for image size to the digital camera 100. The processing in step S617 corresponds to step S415 illustrated in FIG. 4.

Then, in step S618, the control unit 201 determines, via the communication unit 211, whether the image data requested in step S617 has been completely acquired. If it is determined that the image data has not been completely acquired (NO in step S618), the control unit 201 repeats processing in step S618 while waiting for the completion of acquisition of the image data. If it is determined that the image data has been completely acquired (YES in step S618), the processing proceeds to step S619.

In step S619, the control unit 201 displays the image data on the full screen of the display unit 206. As a result, for example, an image is displayed on the full screen in such a manner as the screen 422 illustrated in FIG. 4. Furthermore, although, in FIG. 4, a case where only image data is displayed at the time of displaying the image data is taken as an example, this is not restrictive. For example, the detail information about the image acquired in step S614 may also be displayed together with the image data.

Next, in step S620, the control unit 201 determines whether the wireless LAN communication with the digital camera 100 has been disconnected. As the case where the wireless LAN communication is disconnected, there may be a case where an instruction expressly issued by the user to disconnect the wireless LAN communication has been accepted or a case where no signal from the digital camera 100 is received for a predetermined time or more. If it is determined that the wireless LAN communication has not been disconnected (NO in step S620), the processing returns to step S606. On the other hand, if it is determined that the wireless LAN communication has been disconnected (YES in step S620), the control unit 201 ends the processing in the flowchart of FIG. 6.

Thus far is the description of the operation of the smart device 200 according to the present exemplary embodiment.

As described above, in response to the reception of a request for management information about an image, the digital camera 100 according to the present exemplary embodiment analyzes and reads out detail information about the image in advance before the detail information about the image is requested. Accordingly, a period of time required from the time when the detail information about the image is requested to the time when the detail information about the image starts to be transmitted can be shortened.

In the first exemplary embodiment, a case has been described in which detail information about an image is read out in advance in response to a request for management information about the image operating as a trigger. On the other hand, in a second exemplary embodiment, a case is described in which detail information about an image is read out in advance in response to a request for a thumbnail of the image operating as a trigger.

Since the present exemplary embodiment has many portions common to those of the first exemplary embodiment, a description is made centering on portions specific to the present exemplary embodiment.

<Sequence of System>

Figure 7:
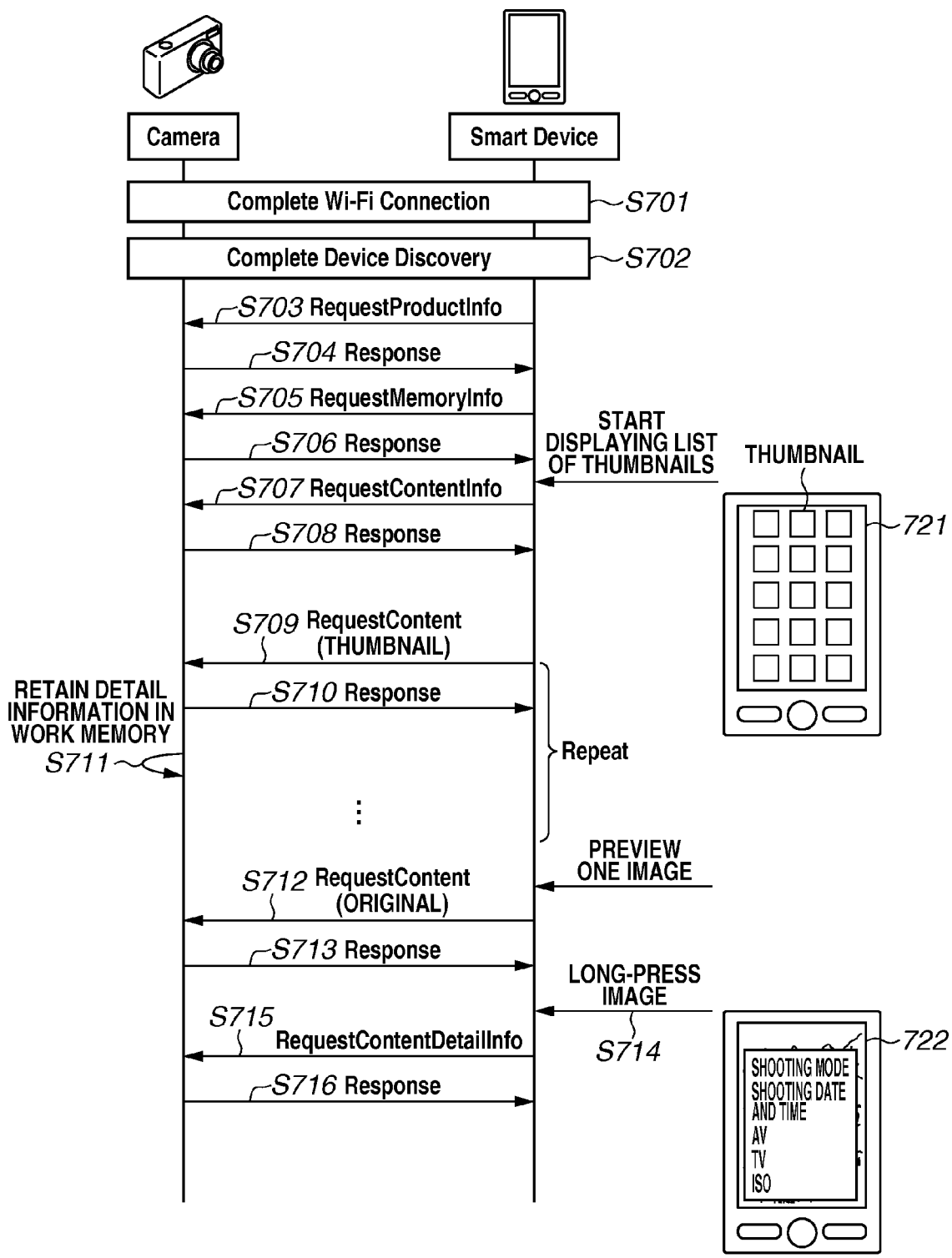
FIG. 7 is a sequence diagram of a system according to a second exemplary embodiment.

FIG. 7 is a sequence diagram illustrating a procedure for viewing data which is implemented by the digital camera 100 and the smart device 200 cooperating with each other according to the second exemplary embodiment.

In steps S701 to S708, processing similar to that in steps S401 to S408 illustrated in FIG. 4 is performed.

Next, in step S709, the smart device 200 calls, to the digital camera 100, a RequestContent API for acquiring a thumbnail to be displayed. In other words, the smart device 200 requests a thumbnail of the image with the argument of the ID of the image the management information about which has been acquired, to the digital camera 100. The processing in step S709 is similar to step S410 illustrated in FIG. 4.

In response to that request, in step S710, the digital camera 100 performs processing corresponding to Request-Content illustrated in FIG. 3A, and transmits thumbnail data to the smart device 200. More specifically, the digital camera 100 reads out thumbnail data by analyzing the header of an image determined based on the ID of the image included in the arguments of the called API, and transmits the read-out thumbnail data to the smart device 200. The processing in step S710 is similar to step S411 illustrated in FIG. 4.

Furthermore, the digital camera 100 according to the present exemplary embodiment performs processing in step S711 in response to the reception of the request in step S709. In step S711, the digital camera 100 reads out detail information about the image the management information about which has been requested in step S709, by analyzing the header region of the image, and retains the read-out detail information in the work memory 104. The processing in step S711 is similar to step S409 illustrated in FIG. 4. Furthermore, since the analysis of the header region is also required to read out a thumbnail, the analysis of the header region performed in step S710 to read out a thumbnail may be used also for the analysis for reading out detail information.

Furthermore, if, in the smart device 200, an instruction to preview an image corresponding to any one of the thumbnails is accepted, processing in steps S712 to S713 is performed to preview an image corresponding to the specified thumbnail. The processing in steps S712 to S713 is similar to steps S415 to S416 illustrated in FIG. 4.

Moreover, in the present exemplary embodiment, an instruction to display detail information can be input by a touch operation performed for a predetermined time or more on a position on the touch panel corresponding to the display region of an image being previewed.

When, in step S714, an instruction to display detail information about the image being previewed has been accepted, processing in steps S715 and S716 is performed.

In step S715, the smart device 200 calls a RequestContentDetailInfo API for acquiring detail information about the image being previewed. In other words, the smart device 200 uses the image ID of the image being previewed as an argument and requests detail information about an image specified by the image ID to the digital camera 100.

In response to that request, in step S716, the digital camera 100 performs processing corresponding to RequestContentDetailInfo illustrated in FIG. 3A, and transmits detail information about the image to the smart device 200. Furthermore, since the detail information requested in step S716 has already been analyzed and read out in step S711, the digital camera 100 can transmit the detail information to the smart device 200 earlier than in a case where the digital camera 100 starts the analysis and reading only after receiving the request in step S715.

<Operation of Digital Camera 100>

Figure 8:
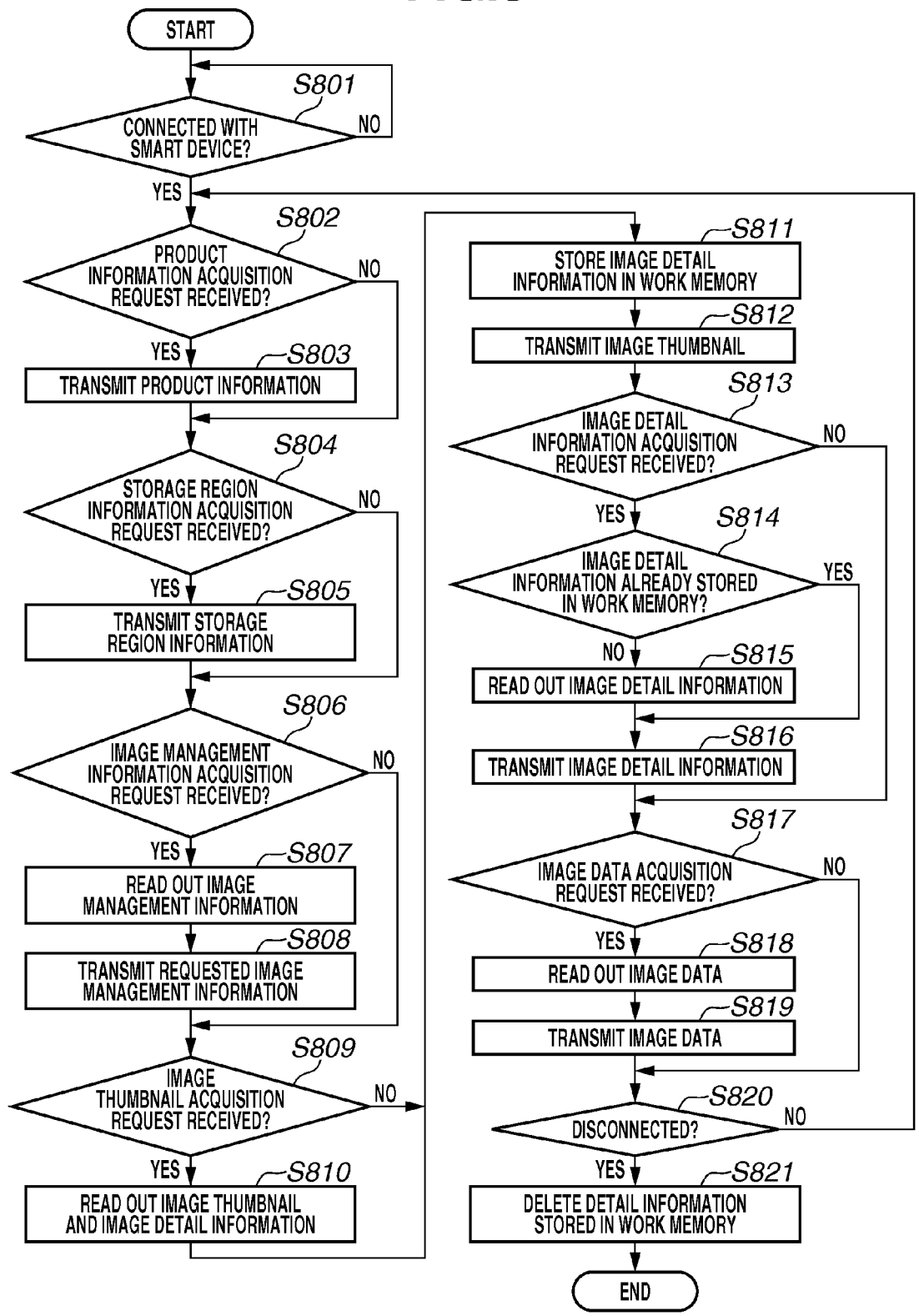
FIG. 8 is a flowchart illustrating an operation of the digital camera according to the second exemplary embodiment.

Next, an operation of the digital camera 100 for implementing the procedure illustrated in FIG. 7 is described. FIG. 8 is a flowchart illustrating the operation of the digital camera 100 according to the second exemplary embodiment. Each processing operation in the flowchart of FIG. 8 is implemented by the control unit 101 loading a program stored in the non-volatile memory 103 onto the work memory 104 and executing the program. Furthermore, the processing in the flowchart of FIG. 8 is started in response to the reception of an instruction issued by, for example, a menu operation of the user to establish a wireless LAN communication with the smart device 200.

In steps S801 to S805, processing similar to that in steps S501 to S505 illustrated in FIG. 5 is performed.

Next, in step S806, the control unit 101 determines, via the communication unit 111, whether a request RequestContentInfo for acquiring management information about an image stored in the digital camera 100 has been received from the smart device 200. If the control unit 101 determines that the request RequestContentInfo has been received (YES in step S806), the processing proceeds to step S807. If the control unit 101 determines that the request RequestContentInfo has not been received (NO in step S806), the processing proceeds to step S809. Step S809 is described below.

In step S807, the control unit 101 reads out, from the directory entry, management information about a specified image among the management information stored in the recording medium 110.

Then, in step S808, the control unit 101 transmits, to the smart device 200 via the communication unit 111, the management information read out in step S807 as a response to the request RequestContentInfo.

Next, in step S809, the control unit 101 determines, via the communication unit 111, whether a thumbnail acquisition request for the image has been received from the smart device 200. More specifically, the control unit 101 determines whether a request RequestContent with the argument of THUMBNAIL has been received. If the control unit 101 determines that the thumbnail acquisition request has been received (YES in step S809), the processing proceeds to step S810. If the control unit 101 determines that the thumbnail acquisition request has not been received (NO in step S809), the processing proceeds to step S813. Step S813 is described below.

In step S810, the control unit 101 analyzes the header of the image subjected to the thumbnail acquisition request, and then reads out a thumbnail from the header and also reads detail information from the header.

Then, in step S811, the control unit 101 stores, in the work memory 304, the detail information read out in step S810.

Next, in step S812, the control unit 101 transmits the thumbnail read out in step S810 as a response to the request RequestContent to the smart device 200.

In step S813, the control unit 101 determines, via the communication unit 111, whether an acquisition request for detail information about the image has been received. More specifically, the control unit 101 determines whether a request RequestContentDetailInfo has been received. If the control unit 101 determines that the request RequestContentDetailInfo has been received (YES in step S813), the processing proceeds to step S814. If the control unit 101 determines that the request RequestContentDetailInfo has not been received (NO in step S813), the processing proceeds to step S817. Step S817 is described below.

In step S814, the control unit 101 determines whether metadata of the image requested from the smart device 200 is already stored in the work memory 104. If the control unit 101 determines that the metadata is not stored (NO in step S814), then in step S815, the control unit 101 reads out the metadata by analyzing the header of the image. If the control unit 101 determines that the metadata is already stored (YES in step S814), the processing proceeds to step S816 without passing through step S815.

In step S816, the control unit 101 transmits the requested detail information about the image as a response to the request RequestContentDetailInfo to the smart device 200 via the communication unit 111. The processing in step S816 corresponds to step S716 illustrated in FIG. 7. Here, in a case where step S816 is performed without passing through step S815, the control unit 101 can transmit the already stored detail information. In this case, since step S815 is not required to be performed, a period of time required from the reception of the request to the transmission of the metadata can be shortened as compared with a case where step S815 is performed.

In steps S817 to S820, processing similar to that in steps S518 to S521 illustrated in FIG. 5 is performed.

If, in step S820, the control unit 101 determines that the wireless LAN communication with the smart device 200 has been disconnected (YES in step S820), the processing proceeds to step S821.

In step S821, the control unit 101 deletes the detail information stored in the work memory 104 in step S811. Then, the processing ends.

Thus far is the description of the operation of the digital camera 100 according to the present exemplary embodiment.

<Operation of Smart Device 200>

Figure 9B:
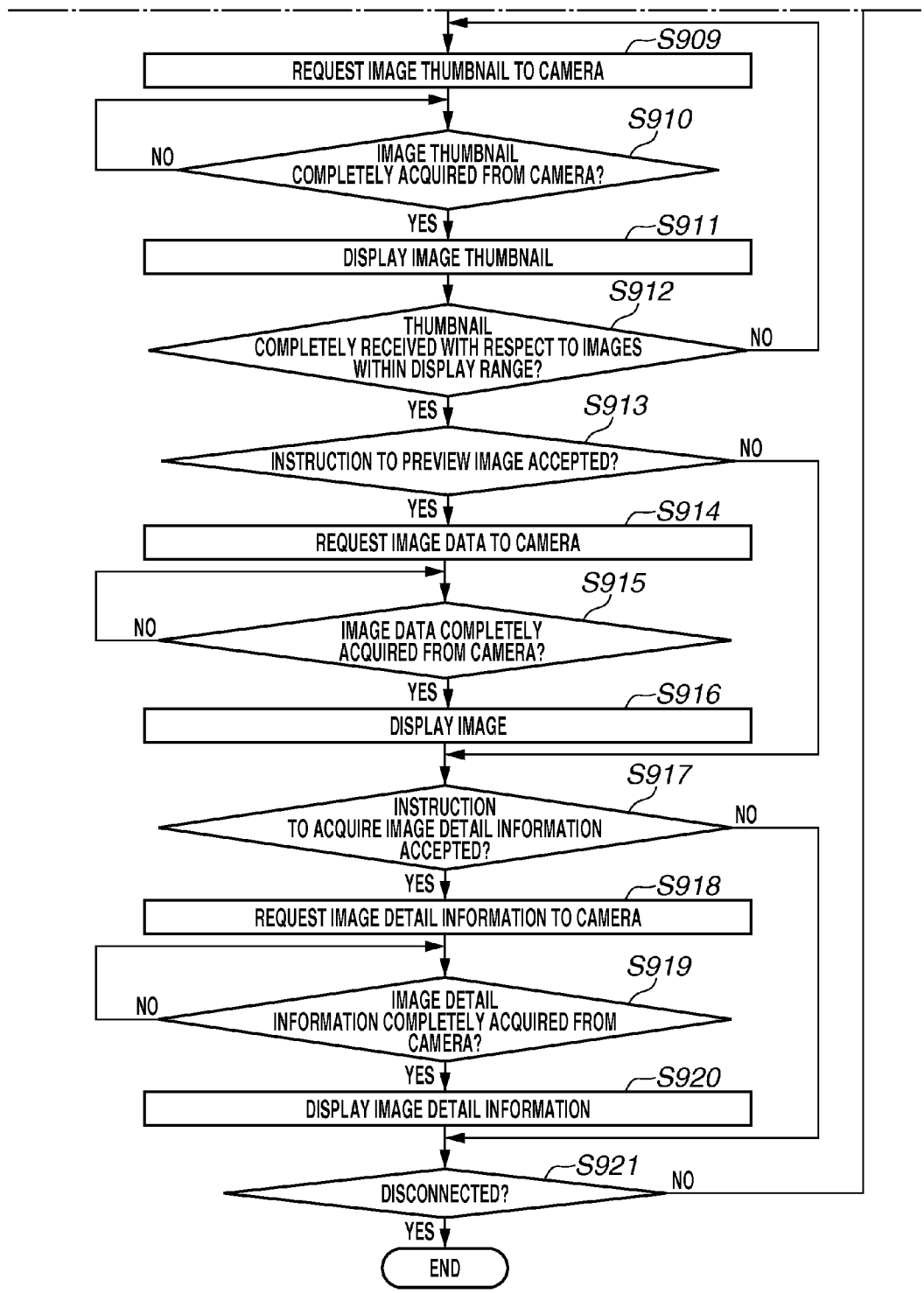
FIG. 9, which is composed of FIGS. 9A and 9B, is a flowchart illustrating an operation of the smart device according to the second exemplary embodiment.

Next, an operation of the smart device 200 for implementing the procedure illustrated in FIG. 7 is described. FIG. 9, which is composed of FIGS. 9A and 9B, is a flowchart illustrating the operation of the smart device 200 according to the second exemplary embodiment. Each processing operation in the flowchart of FIG. 9 is implemented by the control unit 201 loading a program stored in the non-volatile memory 203 onto the work memory 204 and executing the program. Furthermore, the processing in the flowchart of FIG. 9 is started in response to the reception of an instruction issued by, for example, a menu operation of the user to establish a wireless LAN communication with the digital camera 100.

In steps S901 to S911, processing similar to that in steps S601 to S611 illustrated in FIG. 6 is performed.

In step S912, the control unit 201 determines whether the thumbnail has been completely acquired with respect to all of the images within the display range of the display unit 206. If it is determined that the thumbnail has not been completely acquired (NO in step S912), the processing returns to step S909, so that the control unit 201 repeats steps S909 to S911 to acquire and display the remaining thumbnails. If all of the thumbnails to be displayed have been completely acquired as a result of repetition of steps S909 to S911 (YES in step S912), the processing proceeds to step S913.

In steps S913 to S916, processing similar to that in steps S616 to S619 illustrated in FIG. 6 is performed.

Next, in step S917, the control unit 201 determines whether an instruction to request detail information about the image has been accepted. More specifically, the control unit 201 determines whether a touch operation continuing for a predetermined time or more on a position on the touch panel corresponding to the display region of the image being previewed by the processing in step S916 has been accepted. When it is determined that the touch operation continuing for the predetermined time or more has been accepted, the control unit 201 determines that an instruction to request detail information about the image has been accepted. When it is determined that the touch operation continuing for the predetermined time or more has not been accepted, the control unit 201 determines that an instruction to request detail information about the image has not been accepted.

If the control unit 201 determines that the instruction to request detail information about the image has been accepted (YES in step S917), the processing proceeds to step S918. If the control unit 201 determines that the instruction to request detail information about the image has not been accepted (NO in step S917), the processing proceeds to step S921. Step S921 is described below.

In steps S918 to S920, processing similar to that in steps S612 to S614 illustrated in FIG. 6 is performed.

Lastly, in step S921, processing similar to that in step S620 illustrated in FIG. 6 is performed.

Thus far is the description of the operation of the smart device 200 according to the present exemplary embodiment.

Furthermore, although, in the present exemplary embodiment, detail information about an image is displayed after the image is previewed, this is not restrictive. For example, when a list of thumbnails of images is displayed, the user may be allowed to operate the operation unit 205 to acquire detail information about the images. Even in this case, the digital camera 100 retains detail information about an image in the work memory 104 when requesting a thumbnail. Therefore, the digital camera 100 can transmit detail information about an image to the smart device 200 without reading out detail information about the image from the recording medium 110.

As described above, in response to a thumbnail of an image being requested, the digital camera 100 according to the present exemplary embodiment analyzes and reads out detail information about the image in advance before the detail information about the image is requested. Accordingly, a period of time required from the time when the detail information about the image is requested to the time when the detail information about the image starts to be transmitted can be shortened.

In the above-described first exemplary embodiment, a case where detail information is read out in advance with respect to only an image the management information about which has been requested has been described as an example. In addition to this, management information about images before and after a request range in which management information about images has been requested may be read out in advance with respect to only the same number of images as the number of images included in the request range. For example, in a case where an acquisition target range (the request range in which management information about images has been requested) is specified as "31-50", management information about images included in a range of "11-30" and management information about images included in a range of "51-70" are also set as targets to be read out and stored in advance. This is because, in a case where thumbnails other than a list of thumbnails being displayed are to be displayed, it may be likely that a group of thumbnails before or after a group of thumbnails being displayed is next requested after being scrolled.

Furthermore, in the second exemplary embodiment, the digital camera 100 stores detail information about an image in the work memory 104 when a thumbnail of the image has been requested from the smart device 200. In this respect, the digital camera 100 may store detail information about an image in the work memory 104 when not a thumbnail but an image corresponding to the thumbnail has been requested. For example, processing for reading out detail information in step S810 illustrated in FIG. 8 is performed in step S818, and processing corresponding to step S811 is performed next to step S818.

Moreover, some amount of time is required to read out and store detail information. More specifically, a certain amount of time is required to perform processing in steps S508 to S509 illustrated in FIG. 5 or processing in steps S810 to S811 illustrated in FIG. 8. Therefore, the digital camera 100 may be configured to accept another instruction in parallel even in the process of performing these steps. For example, in the case illustrated in FIG. 5, in parallel with processing in steps S508 to S509, processing in step S506 or step S511 is performed to accept a request from the smart device 200. In the case illustrated in FIG. 8, in parallel with processing in steps S810 to S811, processing in step S809 or step S817 is performed to accept a request from the smart device 200. Furthermore, in such a case, when another instruction has been accepted, processing for reading out detail information is once stopped. For example, consider a case where a flick operation has been performed on the smart device 200 while the digital camera 100 is performing processing in step S508, so that it has become necessary to display a new thumbnail. In this case, to acquire a new image ID, a request RequestContentInfo is transmitted from the smart device 200 to the digital camera 100. In that event, the control unit 101 of the digital camera 100 once stops processing in step S508, and then deals with a new request RequestContentInfo and starts processing in step S508 again. In other words, the control unit 101 reads out detail information about an image specified by an image ID transmitted with the new request RequestContentInfo. This enables the digital camera 100 to more smoothly respond to an operation on the smart device 200.

Aspects of the present invention can also be implemented by processing in which a program for implementing one or more functions of the above-described exemplary embodiments is supplied to a system or apparatus via a network or storage medium and one or more processors included in the system or apparatus read and execute the program. Additionally, aspects of the present invention can also be implemented by circuits that implement the one or more functions (for example, application specific integrated circuits (ASIC)).

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-179324 filed Sep. 3, 2014, which is hereby incorporated by reference herein in its entirety.

What is claimed is:

1. A communication apparatus comprising:
a memory for storing data and a computer program; and
a processor coupled to the memory for executing the computer program, the computer program comprising instructions for:
connecting to a recording medium on which content data and management information about the content data are recorded;
communicating with an external apparatus; and
reading out, in response to receipt of a request for the management information about the content data from the external apparatus, the management information about the content data from the recording medium and control the communication unit to transmit the read-out management information to the external apparatus,
reading out-header information recorded in a header region of the content data from the header region and store the read-out header information,
in a case where the header information recorded in the header region of the content data is requested from the external apparatus, determining whether the header information was previously read out and stored, and
if the header information was previously stored, transmitting the stored header information to the external apparatus without reading out the header information anew from the header region of the content data.

2. The communication apparatus according to claim 1, wherein the computer program further comprises instructions for, in a case where the header information recorded in the header region of the content data is requested from the external apparatus, transmitting the header information recorded in the header region of the content data to the external apparatus without transmitting the content data.

3. The communication apparatus according to claim 1, wherein the recording medium includes a data region used to record content data and a management region used to record management information about the content data.

4. The communication apparatus according to claim 3, wherein the management region is a directory entry.

5. The communication apparatus according to claim 1, wherein the content data is image data.

6. The communication apparatus according to claim 5, wherein the management information includes identification information, file name, data size, and generation date and time about the image data.

7. The communication apparatus according to claim 5, wherein the header information recorded in the header region of the image data includes at least one of shooting mode, shooting date and time, shooting location, aperture value, shutter speed value, or ISO value about the image data.

8. The communication apparatus according to claim 1, wherein the computer program further comprises instructions for, in a case where the communication apparatus disconnects from the external apparatus, discarding the stored header information about the content data.

9. The communication apparatus according to claim 1, wherein the computer program further comprises instructions for, in a case where, in a state in which the header information about the content data is stored, the communication apparatus receives a request concerning additional content data, discarding the stored header information about the content data, and reading out header information recorded in a header region of the additional content data and storing the read-out header information about the additional content data.

10. The communication apparatus according to claim 1, wherein the computer program further comprises instructions for accepting a request for management information about a plurality of pieces of content data in a single request from the external apparatus, and
in a case where the communication apparatus receives a request for management information about a plurality of pieces of content data from the external apparatus, transmitting, in response to the request, the management information about the plurality of pieces of content data to the external apparatus, and reading out header information recorded in header regions of the plurality of pieces of content data and storing the read-out header information about the plurality of pieces of content data.

11. The communication apparatus according to claim 10, wherein the computer program further comprises instructions for, in a case where, in a state in which the header information about the plurality of pieces of content data is stored, the communication apparatus receives a request for management information about an additional plurality of pieces of content data from the external apparatus, transmitting, in response to the request, the management information about the additional plurality of pieces of content data to the external apparatus, discarding the stored header information about the plurality of pieces of content data, and reading out header information recorded in header regions of the additional plurality of pieces of content data and stores the read-out header information about the additional plurality of pieces of content data.

12. A control method for a communication apparatus configured to communicate with an external apparatus, the control method comprising:
connecting to a recording medium on which content data and management information about the content data are recorded;
reading out, in response to receipt of a request for the management information about the content data from the external apparatus, the management information about the content data from the recording medium and transmitting the read-out management information to the external apparatus, and reading out header information recorded in a header region of the content data and storing the read-out header information,
in a case where the header information recorded in the header region of the content data is requested from the external apparatus, determining whether the header information was previously read out and stored, and
if the header information was previously stored, transmitting the stored header information to the external apparatus without reading out the header information anew from the header region of the content data.

13. A non-transitory computer-readable storage medium storing computer readable instructions that cause a computer to execute a control method for a communication apparatus configured to communicate with an external apparatus, the control method comprising:
connecting to a recording medium on which content data and management information about the content data are recorded; and
reading out, in response to receipt of a request for the management information about the content data from the external apparatus, the management information about the content data from the recording medium and transmitting the read-out management information to the external apparatus, and reading out header information recorded in a header region of the content data and storing the read-out header information, in a case where the header information recorded in the header region of the content data is requested from the external apparatus, determining whether the header information was previously read out and stored, and if the header information was previously stored, transmitting the stored header information to the external apparatus without reading out the header information anew from the header region of the content data.

* * * * *